(12) United States Patent
Nguyen et al.

(10) Patent No.: US 12,702,984 B2
(45) Date of Patent: Aug. 11, 2026

(54) APPARATUS FOR ORGANIC WASTE TREATMENT

(71) Applicants: Tuan Anh Nguyen, Bien Hoa (VN); Thi Minh Hanh Tran, Bien Hoa (VN)

(72) Inventors: Tuan Anh Nguyen, Bien Hoa (VN); Thi Minh Hanh Tran, Bien Hoa (VN)

( * ) Notice: Subject to any disclaimer, the term of this patent is extended or adjusted under 35 U.S.C. 154(b) by 301 days.

(21) Appl. No.: 18/568,079

(22) PCT Filed: Jun. 19, 2022

(86) PCT No.: PCT/IB2022/055678
§ 371 (c)(1),
(2) Date: Dec. 7, 2023

(87) PCT Pub. No.: WO2022/269444
PCT Pub. Date: Dec. 29, 2022

(65) Prior Publication Data

US 2024/0278255 A1 Aug. 22, 2024

(30) Foreign Application Priority Data

Jun. 23, 2021 (VN) .............................. 1-2021-03764

(51) Int. Cl.
*B02C 18/00* (2006.01)
*B02C 18/14* (2006.01)
(Continued)

(52) U.S. Cl.
CPC ........ *B02C 18/0084* (2013.01); *B02C 18/142* (2013.01); *B02C 18/2216* (2013.01);
(Continued)

(58) Field of Classification Search
CPC .............. B02C 18/0084; B02C 18/142; B02C 18/2216; B02C 18/2233; B09B 3/32;
(Continued)

(56) References Cited

U.S. PATENT DOCUMENTS 6,126,100 A * 10/2000 Barth .................. B29B 17/0026 241/243
6,357,682 B1 * 3/2002 Hext ..................... B02C 18/141 241/161
(Continued)

FOREIGN PATENT DOCUMENTS

CN 109759417 A 5/2019
CN 109759417 B * 11/2020
(Continued)

OTHER PUBLICATIONS

English translate (CN109759417B), retrieved date Nov. 12, 2025.*
(Continued)

*Primary Examiner* — Mohammed S. Alawadi
(74) *Attorney, Agent, or Firm* — Foley & Lardner LLP

(57) ABSTRACT

The present invention relates to an organic waste treatment apparatus consisting of a garbage receiving unit, a probing door, a garbage compactor unit, a crushing unit fixed to the upper part of the structure frame, a mixing unit positioned underneath the crushing unit, a motor that drives all movements of the apparatus using belt drive and gear drive, and a control panel controlling the functions of this device.

20 Claims, 26 Drawing Sheets

(51) Int. Cl.

| | |
|---|---|
| ***B02C 18/22*** | (2006.01) |
| ***B09B 3/32*** | (2022.01) |
| ***B09B 3/35*** | (2022.01) |
| ***B09B 3/60*** | (2022.01) |
| ***B09B 101/25*** | (2022.01) |
| ***B09B 101/70*** | (2022.01) |
| ***B65F 1/14*** | (2006.01) |
| ***B65F 5/00*** | (2006.01) |
| ***C05F 9/02*** | (2006.01) |
| ***C05F 17/914*** | (2020.01) |
| ***C05F 17/95*** | (2020.01) |
| ***C05F 17/964*** | (2020.01) |
| ***C05F 17/993*** | (2020.01) |

(52) U.S. Cl.
CPC ............ *B02C 18/2233* (2013.01); *B09B 3/32* (2022.01); *B09B 3/35* (2022.01); *B09B 3/60* (2022.01); *B65F 1/1405* (2013.01); *C05F 9/02* (2013.01); *C05F 17/95* (2020.01); *C05F 17/964* (2020.01); *C05F 17/993* (2020.01); *B09B 2101/25* (2022.01); *B65F 2210/12* (2013.01)

(58) Field of Classification Search
CPC ......... B09B 3/35; B09B 3/60; B09B 2101/25; B09B 2101/70; B09B 5/00; B65F 2210/12; B65F 1/1405; C05F 9/02; C05F 17/95; C05F 17/964; C05F 17/993; C05F 17/914
See application file for complete search history.

(56) References Cited

U.S. PATENT DOCUMENTS

| | | | | |
|---|---|---|---|---|
| 2010/0276526 | A1* | 11/2010 | Shin-Ya | B02C 18/0084 241/101.5 |
| 2015/0083835 | A1* | 3/2015 | Lowe | B02C 18/2258 241/36 |
| 2018/0214885 | A1* | 8/2018 | Garin Rotondaro | C04B 18/021 |

FOREIGN PATENT DOCUMENTS

| | | | | |
|---|---|---|---|---|
| DE | 102014004492 | A1 * | 9/2015 | C12M 45/02 |
| ES | 2471716 | A | 6/2014 | |
| FR | 2995299 | A1 | 3/2014 | |
| KR | 20090005219 | U * | 6/2009 | B02C 18/142 |
| RU | 2401701 | C1 | 10/2010 | |
| RU | 2579789 | C1 | 4/2016 | |
| RU | 2595143 | C1 | 8/2016 | |
| WO | WO-2008/000510 | A2 | 1/2008 | |
| WO | WO-2013/128351 | A1 | 9/2013 | |

OTHER PUBLICATIONS

English translate (DE102014004492A1), retrieved date Nov. 12, 2025.*

English translate (KR20090005219U), retrieved date Nov. 12, 2025.*

International Search Report and Written Opinion for International Patent Application PCT/IB2022/055678 dated Sep. 30, 2022.

* cited by examiner

APPARATUS FOR ORGANIC WASTE TREATMENT

CROSS-REFERENCE TO RELATED APPLICATION

This application is a U.S. 371 National Stage Application of PCT International Application No. PCT/IB2022/055678, filed Jun. 19, 2022, which claims priority to Vietnamese Patent Application No. 1-2021-03764, filed Jun. 23, 2021, the content of each of which is incorporated by reference in its entirety for all purposes.

FIELD

The present invention relates to the treatment of household waste. Specifically, the invention relates to an apparatus being used to produce organic fertilizers from organic waste from daily activities at home, office cafeteria, farm, factory, etc.

BACKGROUND

Down through the years, the collection and classification of waste in Vietnam, as well as everywhere in the world, have gained more and more attention. Some countries have well implemented the collecting and sorting of waste from households, public places to waste treatment plants. However, in many other countries, including Vietnam, the sorting of waste at source hasn't been well implemented. It can be said that, currently, it is impossible to separate waste at source. After studying people's behavior in daily life, the inventor realized that the devices for temporary storage of waste are not suitable for garbage collection and classification, especially for organic waste (including leftovers, animal and vegetable waste, etc.). Since waste is stored in the garbage can for a while before being collected and transported to a centralized place for treatment, the decomposition of organic waste can create an unpleasant smell. In order to avoid stench, people often use multiple plastic bags to store these organic wastes at home before sending them to garbage trucks or landfills. This complicates the sorting of waste at treatment plants.

The following patent documents are provided for reference:

Patent document 1: Publication of international patent application No. WO 2013/128351 A1

Patent document 2: Publication of international patent application No. WO 2008/000510

Patent document 3: Publication of Spanish patent application No. ES 2471716 A1

Patent document 4: Publication of Russian Federation Patent No. RU 2401701 C1

Patent document 5: Publication of Russian Federation Patent No. RU 2579789 C1

Patent document 6: Publication of Russian Federation Patent No. RU 2595143 C1

Background of Invention: The main purpose of the present invention is to prevent stench arising from organic waste kept at home, and to treat organic waste at the source to form composting fertilizers.

The specific purpose of the present invention is to create an organic waste treatment apparatus that is capable of performing at least one of the following functions: (i) pressing organic waste into contact with the cutters of the crushing unit for a fast and thorough crushing; (ii) automating the probiotic spray operation so that the crushed waste can absorb the probiotics more evenly; (iii) detecting or removing metal objects that accidentally entered the grinding unit, cleaning the grinding unit area, refilling the probiotic container; (iv) periodic mixing of ground and permeated waste with probiotics in order to accelerate the decomposition process and the separation of liquid, methane (CH4) and ammonia (NH3); (v) draining the liquid in the garbage and the liquid that was generated during the process of decomposition; (vi) venting methane (CH4), ammonia (NH3) and other emissions in the process of waste decomposition in order to minimize odors at the place where the apparatus is installed.

SUMMARY

In order to achieve at least one of the above functions, the present invention provides an organic waste treatment apparatus comprising:

- a garbage receiving unit which consists of two compartments:
  - the first compartment hosts a garbage compactor unit which includes the upper inlet corresponding to the first opening of the top cover with a probing door,
  - the second compartment corresponds to the second opening of the top cover with a cover that can be closed/open and an exit door located at the bottom and adjacent to the inlet of a crushing unit;
- the garbage compactor unit has the function of pressing the garbage from top to bottom. This will press the garbage into the cutters of the crushing unit,
- a crushing unit, fixed on the upper part of the structure frame, consisting of: a crushing chamber, a driving shaft, a driven shaft which is mounted horizontally and parallel to the driving shaft, several cutters which are mounted on the driving shaft and the driven shaft for crushing garbage, a first gear transmission connecting the driving shaft to a motor, and a second gear transmission connecting the driving shaft to the driven shaft;
- a mixing unit, positioned underneath the crushing unit, consisting of: a mixing compartment, a mixing shaft connected to the motor with a belt, a mixing compartment cover fixed to the top of the mixing compartment for preventing the material from spilling out during the mixing operation, a mixing compartment door located on the mixing compartment cover for receiving ground garbage from the crushing unit, a discharge outlet located on the wall of the mixing compartment and far from the crushing unit, which can be opened/closed;
- a motor with reversible rotation function, equipped with magnetic starter, current sensor, rev counter, and timer; and
- a control panel to control the functions of this device.

In accordance with one embodiment of the present invention, the garbage compactor unit consists of: a guiding box fixed to the rear wall of the garbage receiving unit for guiding a rack in vertical motion, a gear-bearing shaft with two shaft ends mounted on two rotating platform on the two side walls of the garbage receiving unit, a gear that is fixed to the gear-bearing shaft, the rack moves in tandem with the gear on the gear-bearing shaft, two cranks that are mounted in two extremities of the shaft to control the rotation of the gear for moving the rack vertically, a garbage presser which is mounted on a garbage presser support located at the lower end of the rack.

In accordance with another embodiment of the present invention, the mentioned waste treatment apparatus also includes a probiotic spray unit to spray the probiotics and make the probiotics mix evenly into the crushed garbage.

In accordance with another embodiment of the present invention, the probiotic spray unit includes a probiotic container located inside the first compartment of the garbage receiving unit, a suction pipe for conducting probiotics to a probiotic pump, two nozzles connecting the output of the probiotic pump to a T-shaped connector, and two nozzles connected to the two outputs of the T-shaped connector and fixed onto the wall of the garbage receiving unit.

In accordance with another embodiment of the present invention, the garbage guiding compartment has a funnel-shaped design with several small holes on the bottom plate for extracting the liquid in the garbage, which will be conducted to a waste liquid container via a drain pipe.

In accordance with another embodiment of the present invention, the waste liquid container, fixed at the bottom of the structure frame of the said apparatus for catching the waste liquid escaping from the drainage holes located on the bottom of the garbage guiding compartment and the mixing compartment, comprises a mesh tray which is placed inside the waste liquid container for filtering and retaining fine granular material, and a drain hose which is located on the side near the bottom of the waste liquid container for discharging the filtered waste liquid to the outside.

In accordance with another embodiment of the present invention, the venting unit includes exhaust fans and exhaust pipes to carry methane, ammonia and other emissions generated during the decomposition process to the outside of the said apparatus to be processed according to the demand of use.

In accordance with another embodiment of the present invention, the mentioned waste treatment apparatus also includes a negative ion generator for deodorizing and killing bacteria in the internal space of this device.

In accordance with another embodiment of the present invention, wherein the two stages of spiral blades of a mixing shaft are mounted on the same axis but in two opposite directions so that, when the mixing shaft rotates clockwise, the outer spiral blade will push the material located in the area near the wall of the mixing compartment in the direction from the side of the grinding unit towards the outlet of the mixing compartment; the inner spiral blade will push the material located in the area near the center of the mixing shaft in the direction from the side of the discharge port to the side of the grinding unit.

In accordance with another embodiment of the present invention, a control panel includes: a power on button and a power off button for switching on and off the apparatus; a rotary switch with three positions: the first position controls the motor to perform the function of crushing or discharging, the second position controls the motor to perform the function of periodic mixing, and the third position controls to stop the motor; a button for controlling the probiotic pump; an on/off button for controlling the exhaust fan; an on/off button for controlling the negative ion generator; and an indicator light that will be lit up when the volume of waste in the mixing compartment reaches a predetermined level.

In some embodiments of the present invention, the said waste treatment apparatus also includes an optical sensor which is located on the side of the mixing compartment and connected to an indicator light on the control panel for giving warning signals when the material in the mixing compartment reaches a predetermined level.

In some embodiments of the present invention, the mentioned waste treatment apparatus also includes a travel switch, which is fixed to the rear cover of the garbage receiving unit through a support plate close to the probing door and will be activated only when the door is closed, meaning that the apparatus will not operate when the door is open, ensuring the safety of the user.

In some embodiments of the present invention, a discharge outlet consists of a hinged opening/closing lid and is tightened by bolts with a knob.

In yet further embodiments of the present invention, the mentioned waste treatment apparatus also includes two wheels which are mounted under the structure frame for easy transportation.

It should be noted that the technical nature of the present invention is presented in order to introduce concepts related to organic waste treatment apparatus. Detailed description of the present invention will be described below and illustrated with drawings. This section of technical background is not intended to define the essential features of the invention nor to be used in determining the scope of the invention.

Advantageous Effects of Invention: The present invention introduces several effectiveness: preventing stench (due to the decomposition of organic waste) in the area where this apparatus is located; no need for emptying the trash every day because the crushed waste takes up a smaller volume and can be kept in the mixing compartment for many days until this compartment being full; converting of organic waste into organic fertilizer that can be used for farming.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

The detailed description below contains references to the accompanying drawings for a better understanding of the technical features of the present invention. All drawings must be consulted in combination with the description in order to fully understand the structure and operating principle of the said apparatus. In addition, it should be understood that the specific examples or specific parameters (if any) given in the following description are for illustrative purposes only, not for the purpose of limiting the scope of patent protection under such parameters. A person with average technical knowledge can completely make changes and adjustments in the structure of the device to bring about an effect equivalent to the invention. Such changes or corrections will obviously be construed as still within the scope of the claim of the invention.

Figure 1:
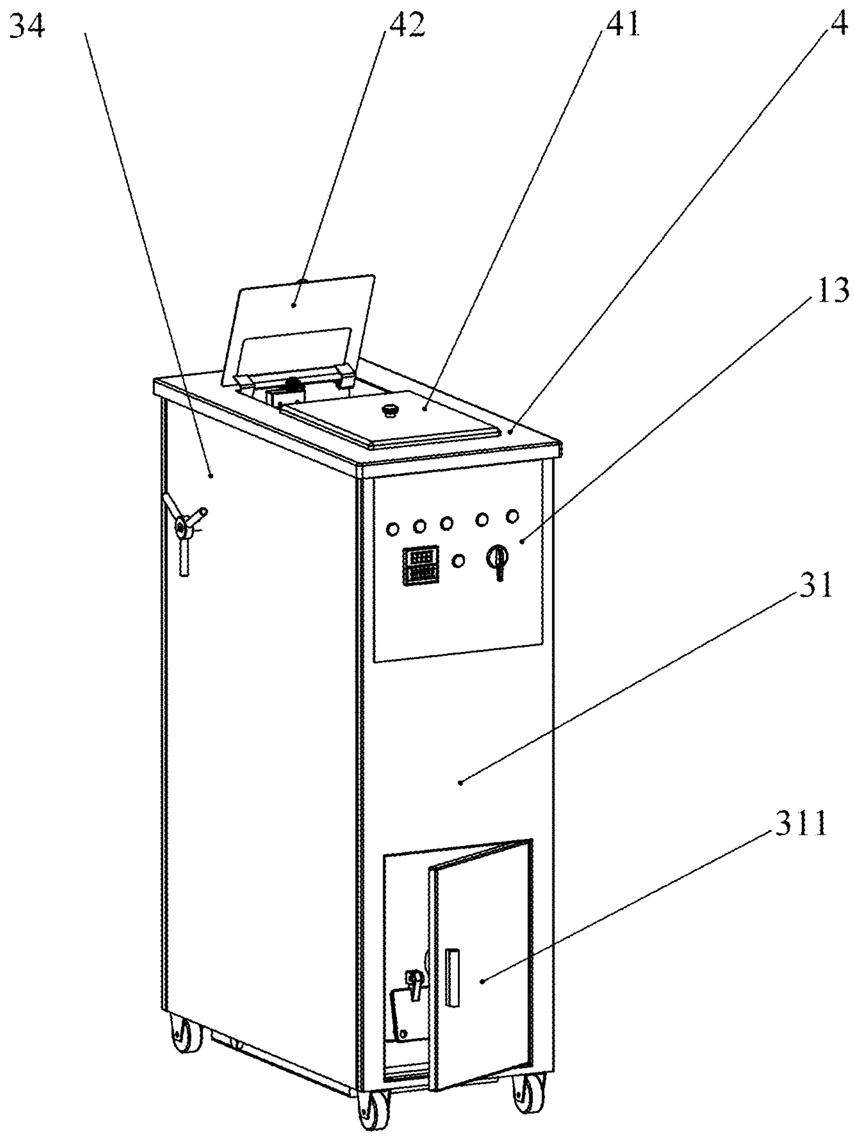
FIG. 1 is a perspective image from the front view, showing the overall structure and the shape of the organic waste treatment apparatus according to the present invention in the state that the front door 311 is partially opened, the probing door 42 on the top cover is opened, the garbage inlet (inlet of the garbage compartment) is covered.
Figure 2:
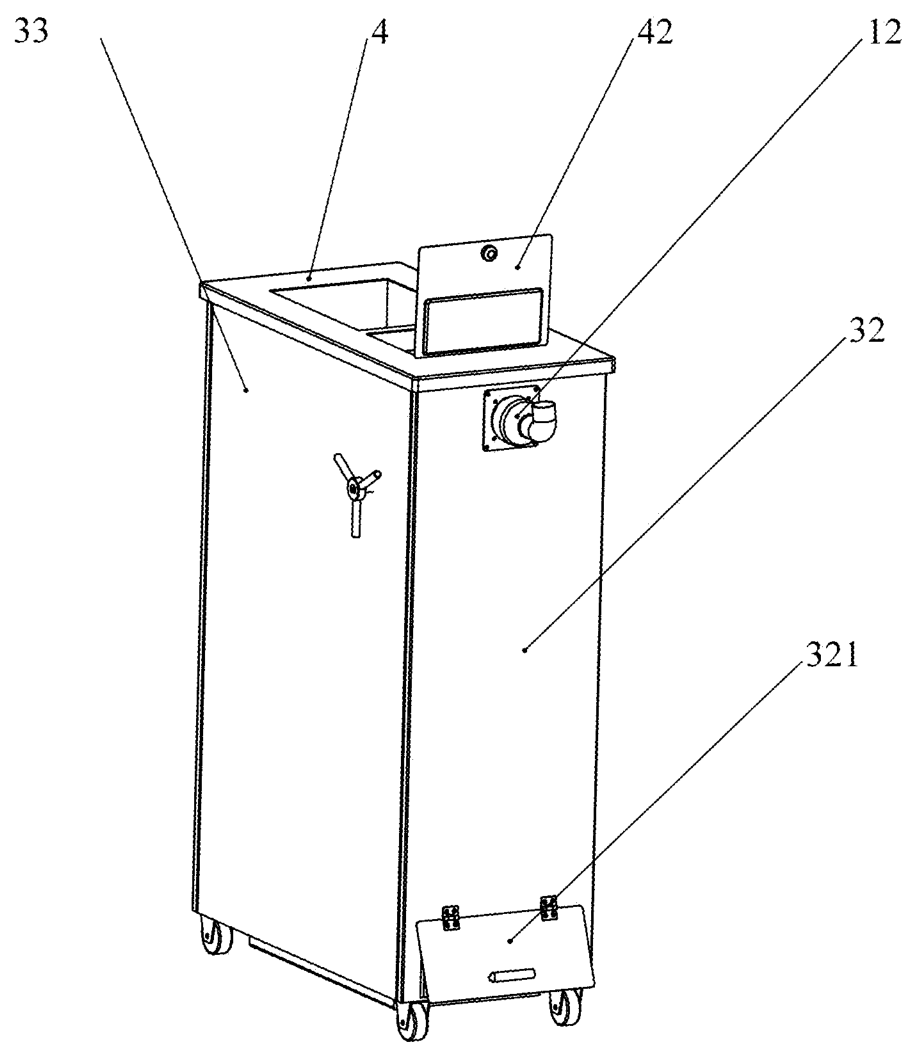
FIG. 2 is a perspective image from the back view, showing the overall structure and the shape of the organic waste treatment apparatus according to the present invention in the state that the rear door 321 is partially opened, the probing door 42 on the top cover is opened, the garbage inlet (inlet of the garbage compartment) is opened.
Figure 3:
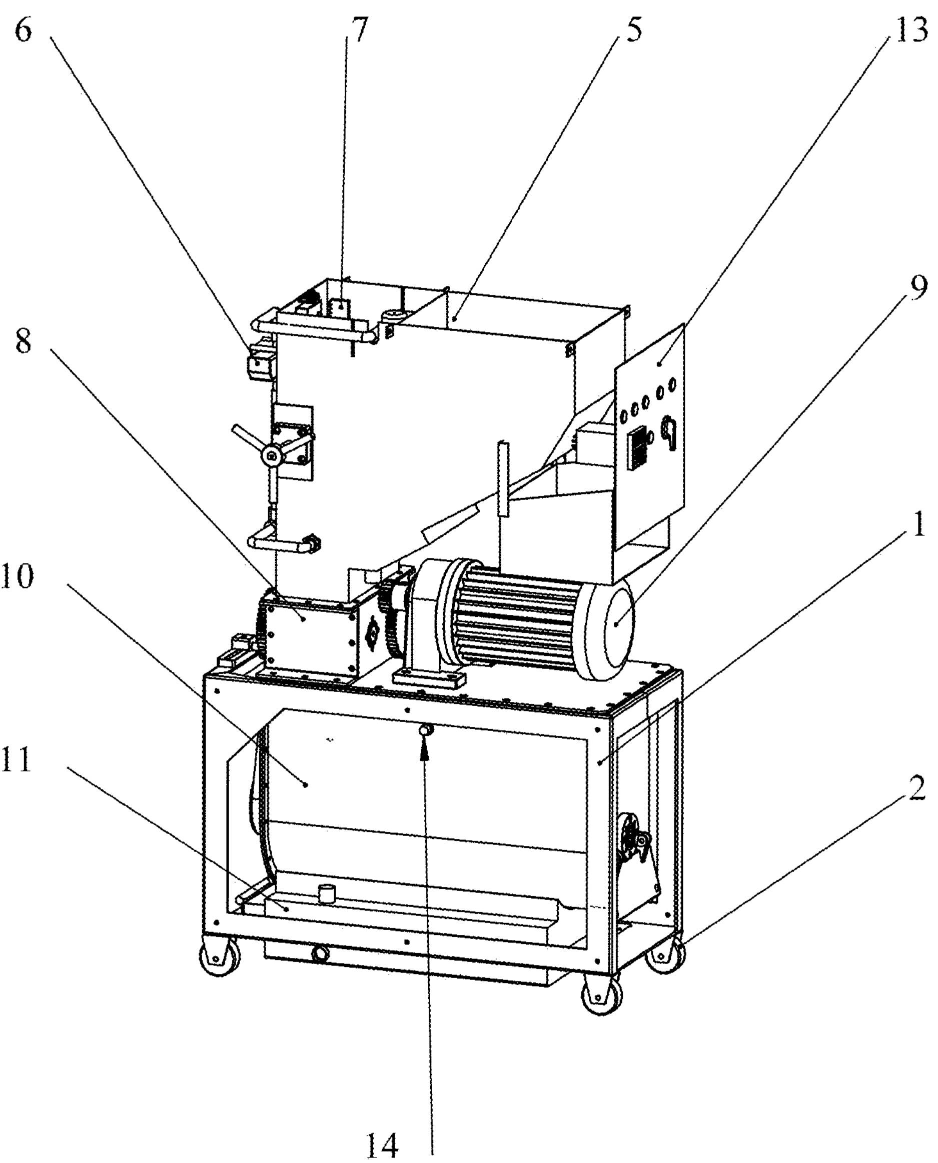
FIG. 3 is a perspective image from the side and front view, showing the structure of the organic waste treatment apparatus according to the present invention in the state that the covers on both sides, front, and side panels have been removed.

As shown on drawings FIG. 1, FIG. 2 and FIG. 3, the organic waste treatment apparatus consists of the structure frame 1, the wheels 2, four side covers 3 including the front cover 31, the rear cover 32, the right cover 33 (view from front to back), and the left cover 34, the top cover 4, the garbage collector 5, the probiotic spray unit 6, the garbage compactor unit 7, the crushing unit 8, the motor 9, the mixing unit 10, the waste liquid container 11, the air venting unit 12, the control panel 13 to control the function of this apparatus, and an optical sensor 14;

As shown in FIG. 1, the front cover 31 also includes the front door 311 providing access to discharge outlet 1012 of the mixing unit 10. As shown in FIG. 2, the rear cover 32 also includes the rear door 321 providing access to the mesh tray 111 of the waste liquid container 11.

Figure 4:
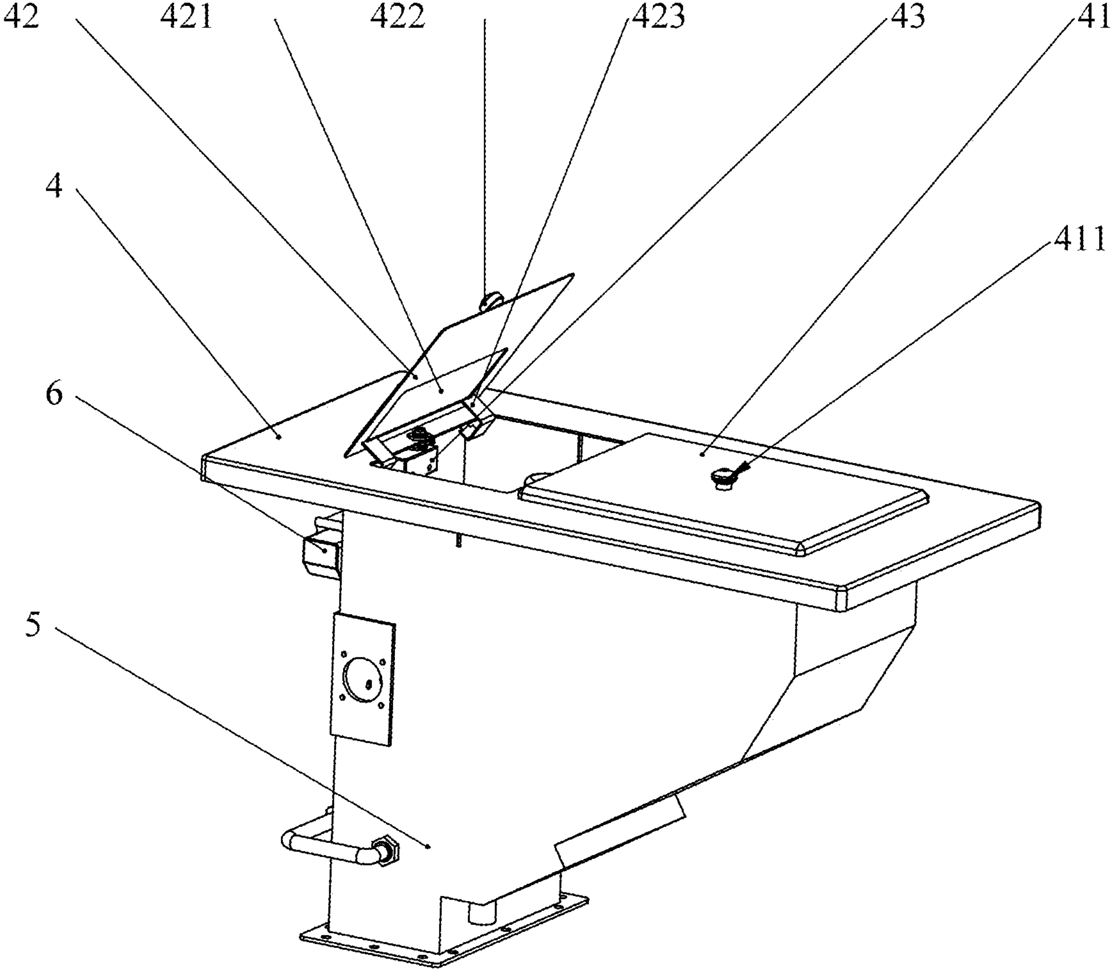
FIG. 4 is the perspective image of the garbage receiving unit 5 according to the present invention, showing part of the structure of the probing door 42 in the open state.
Figure 4A:
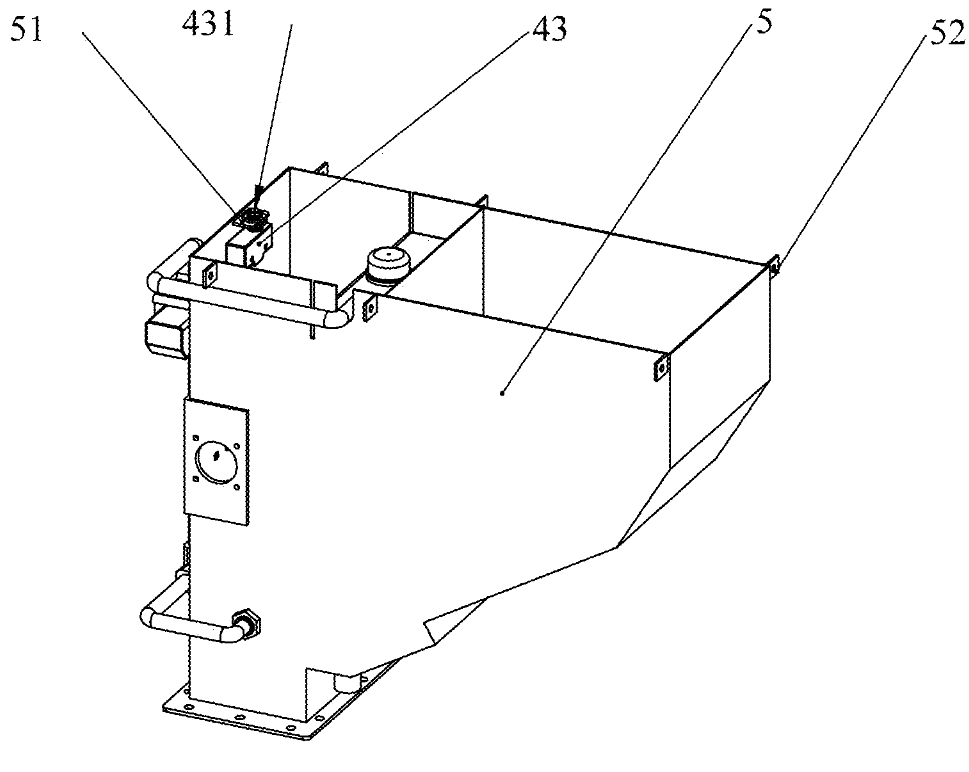
FIG. 4A is a perspective view of the garbage receiving unit 5 of the present invention with the top cover 4 removed showing the position of the limit switch 43 and support plate 51.
Figure 4B:
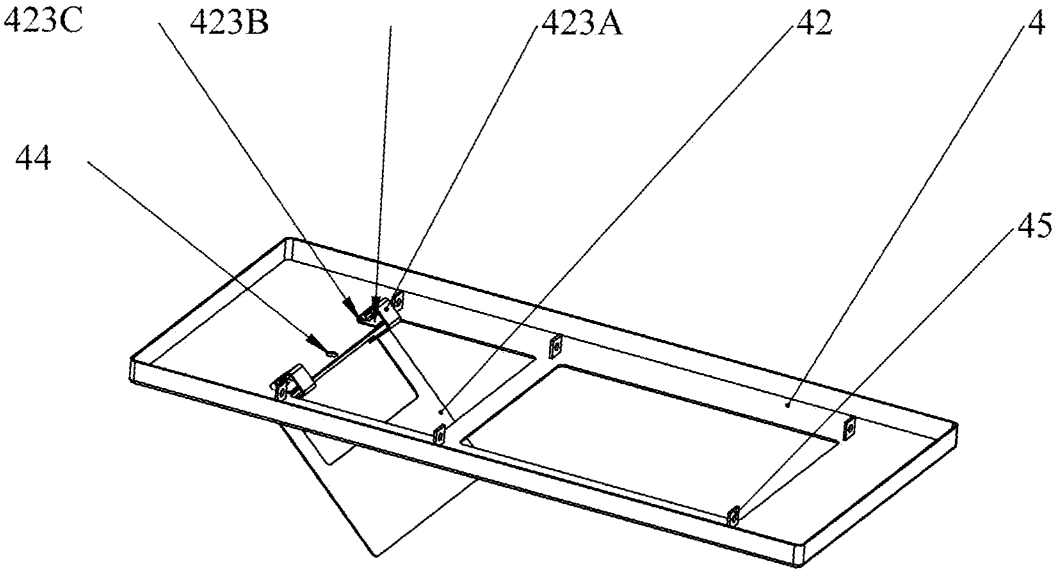
FIG. 4B is a perspective view of top cover 4 being inverted according to the present invention showing the connection with the probing port 42.

As shown in FIGS. 4, 4A, and 4B, the top cover 4 is fixed to the top face of the garbage receiving unit 5 through the supports 52 and the supports 45. In the first compartment of the garbage receiving unit 5, corresponding to the first opening of the top cover 4, the probing door 42 is fixed on the top cover 4 with the hinge 423 where the swinging leaf 423A is fixed (e.g., by welding) to the probing door 42, the fixed leaf 423B is fixed (e.g., by welding) to the top cover 4, the swinging leaf 423A and the fixed leaf 423B rotate around the hinge pin 423C. In the second compartment of the garbage receiving unit 5, corresponding to the second opening of the top cover 4, the cover 41 is equipped with the handle 411 which can be closed or opened to collect garbage.

Figure 4C:
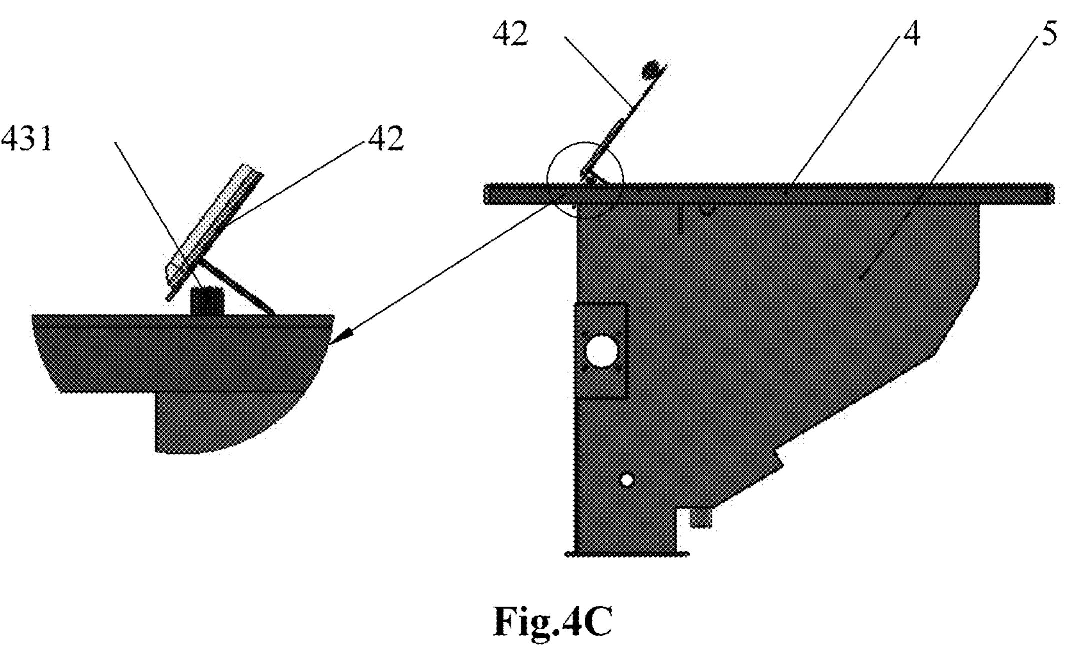
FIG. 4C is the side view of the garbage receiving unit 5 according to the present invention showing the probing door 42 in the open state (switch 431 is open)

As shown in FIG. 4, FIG. 4A, FIG. 4B, and FIG. 5A, the support plate 51 is fixed (e.g., by welding) to the rear cover 510 of the garbage receiving unit 5. The limit switch 43 (normally open) is installed in the support plate 51 so that the push button 431 of the limit switch 43 goes through the hole 44 of the top cover 4 and points towards the probing door 42;

As shown in FIG. 4C, corresponding to the probing door 42 in the open state, the probing door 42 does not affect the push button 431 of the limit switch 43, causing the electrical circuit to open. Hence, the organic waste treatment apparatus will not work.

Figure 4D:
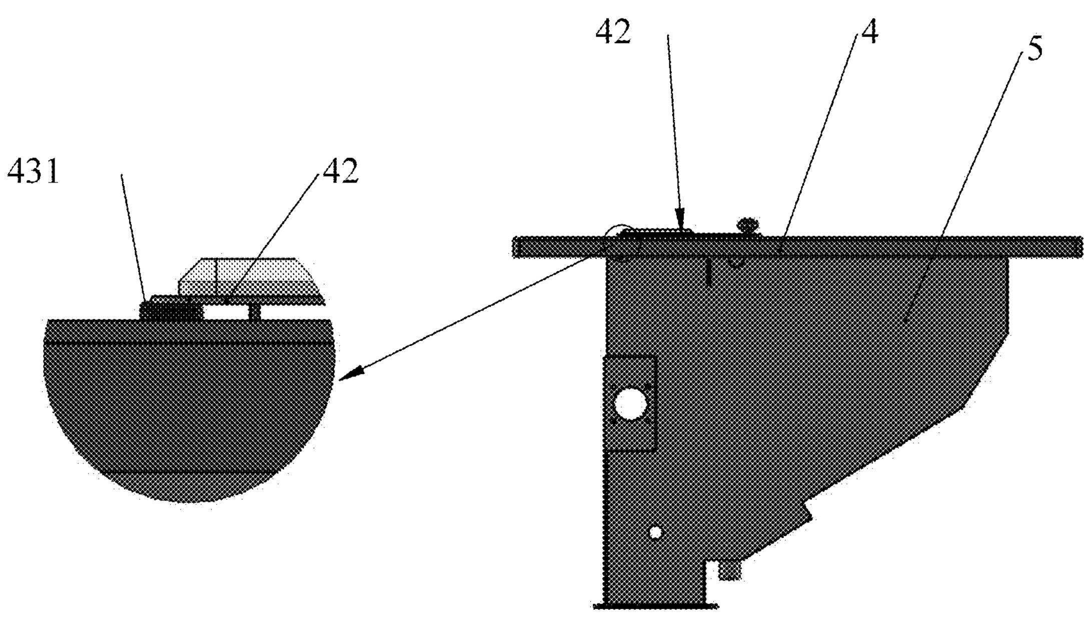
FIG. 4D is the side view of the garbage receiving unit 5 according to the present invention showing the probing door 42 in the closed state (switch 431 is closed)

As shown in FIG. 4D, corresponding to the probing door 42 in the closed state, the probing door 42 presses on the push button 431 of the limit switch 43, causing the electrical circuit on the limit switch 43 to close. Hence, the organic waste treatment apparatus is in ready-to-operate state.

By arranging the probing door 42 and the limit switch 43 as shown in FIG. 4, FIG. 4A, FIG. 4B, FIG. 4C, and FIG. 4D, it is ensured that the said apparatus will not operate when the probing door 42 is open, thus ensuring the safety of the user.

Figure 5:
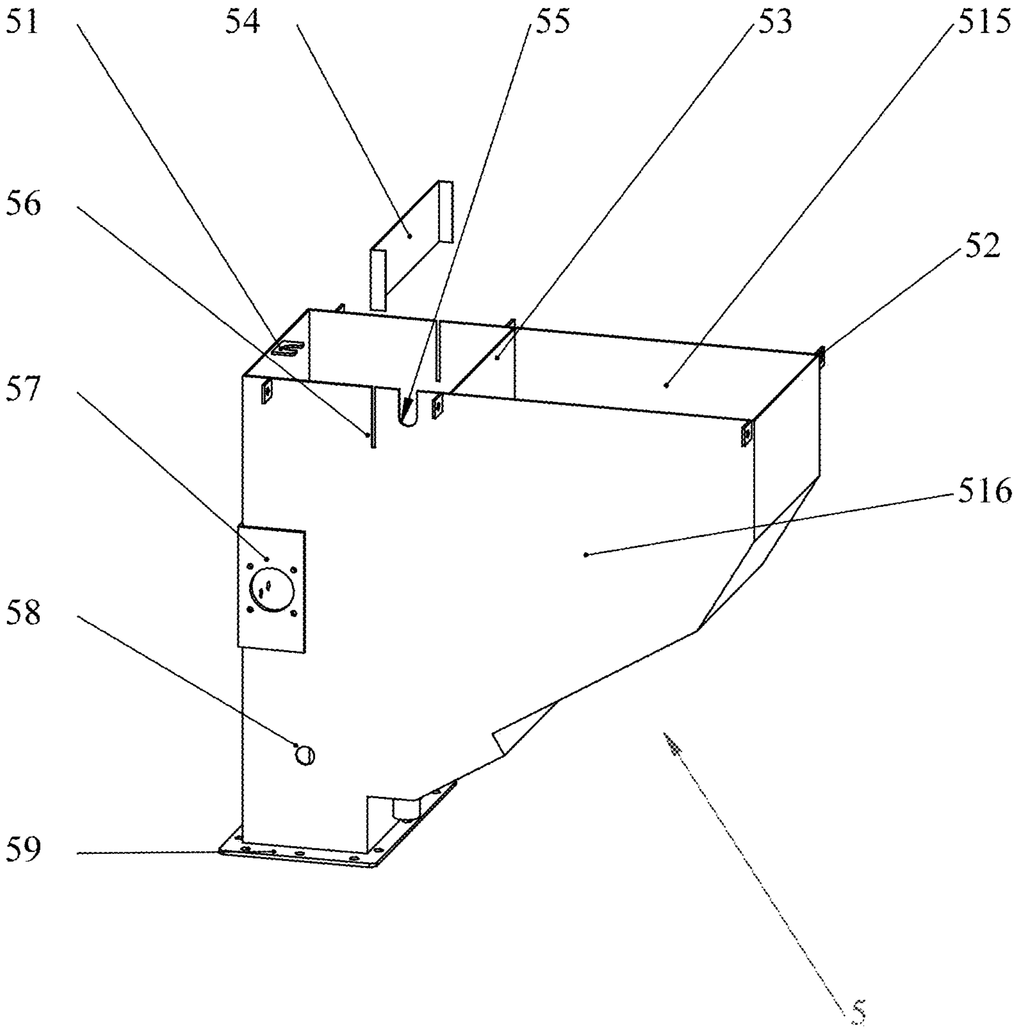
FIG. 5 is a perspective image showing the structure of the garbage receiving unit 5 according to the invention.
Figure 5A:
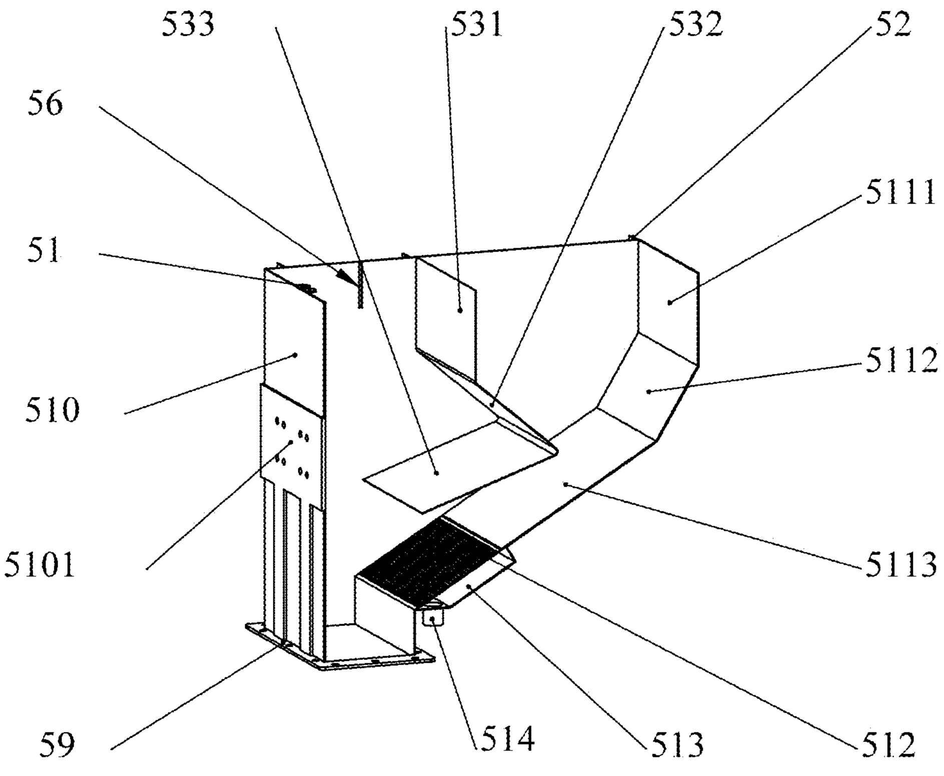
FIG. 5A is a perspective image showing the internal structure of the garbage receiving unit 5 according to the present invention.
Figure 5B:
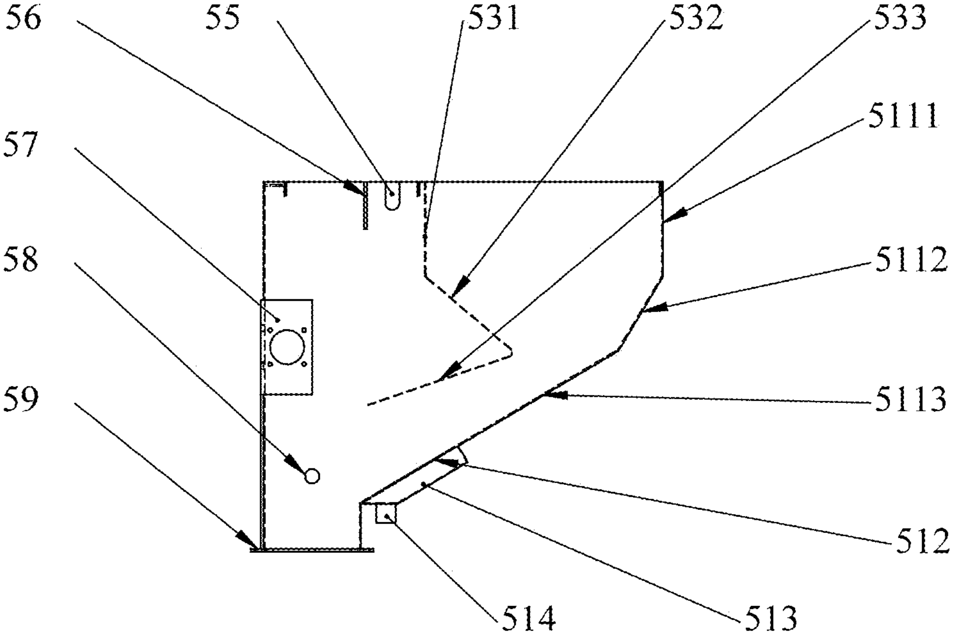
FIG. 5B is a side view showing the structure of the garbage receiving unit 5 according to the present invention.
Figure 7:
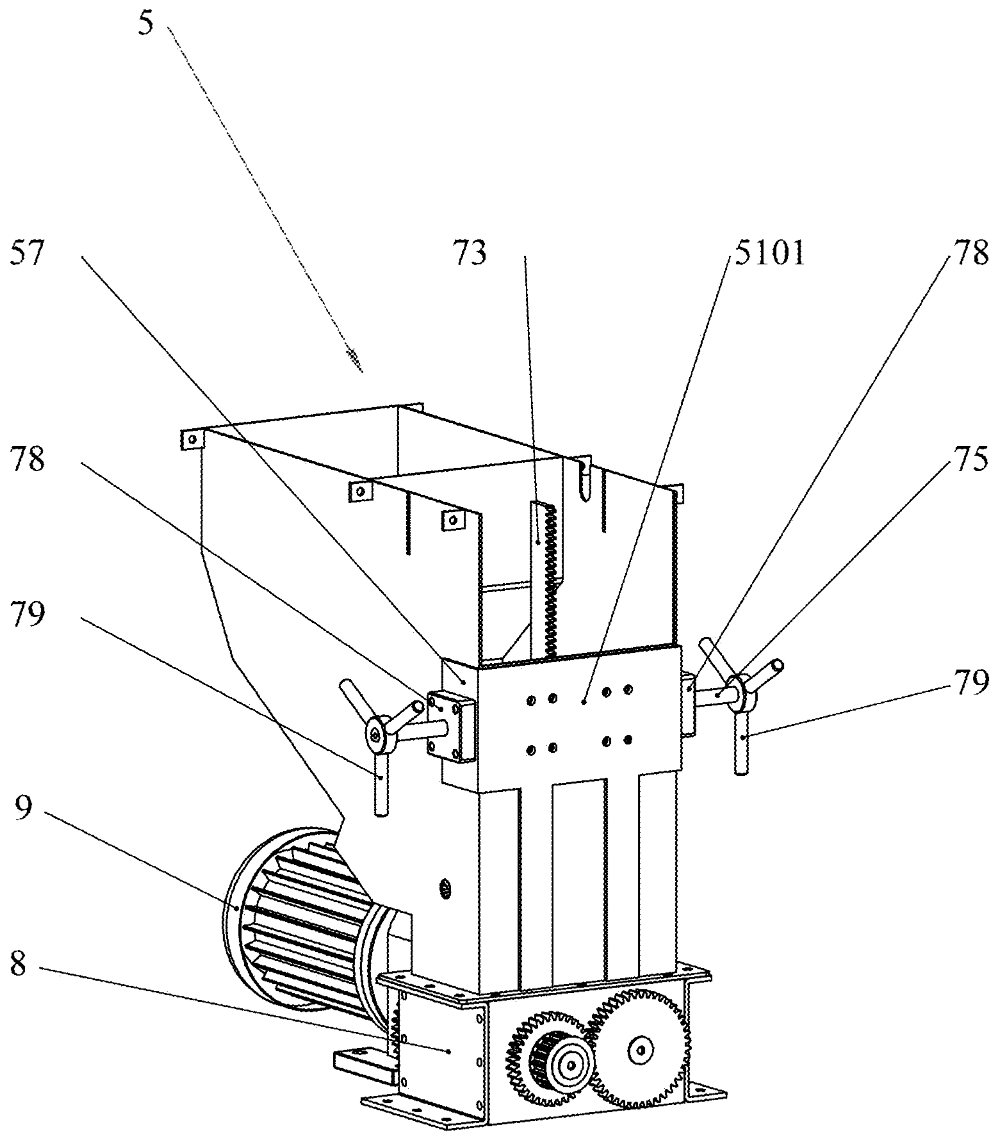
FIG. 7 is a perspective image showing the shape and structure of the garbage receiving unit 5 according to the present invention, with the assembled garbage compactor unit 7, the motor 9 and the crushing unit 8.
Figure 7A:
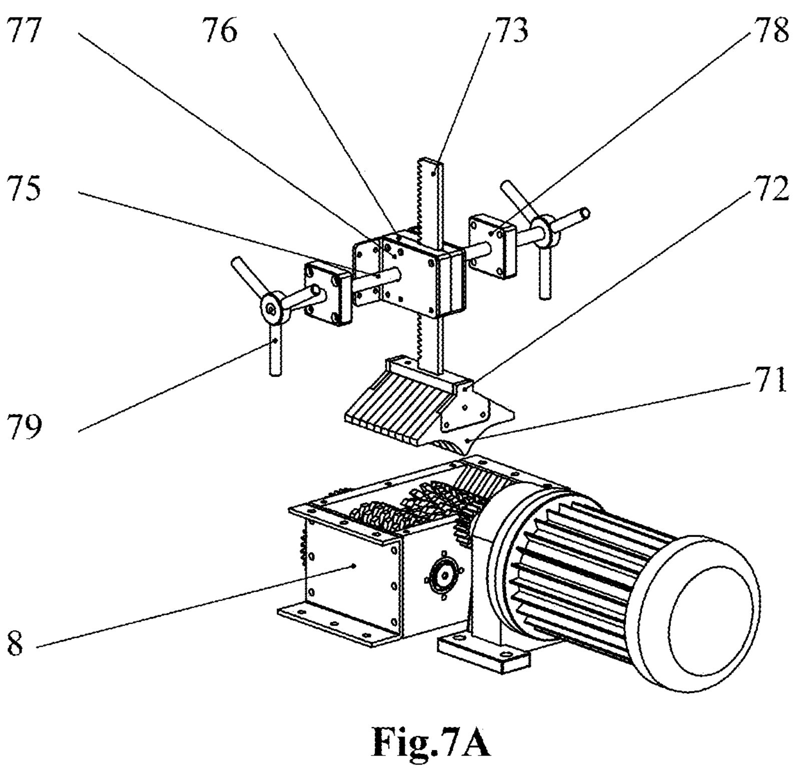
FIG. 7A is a perspective image showing the shape and structure of the garbage compactor unit 7 according to the invention.
Figure 7B:
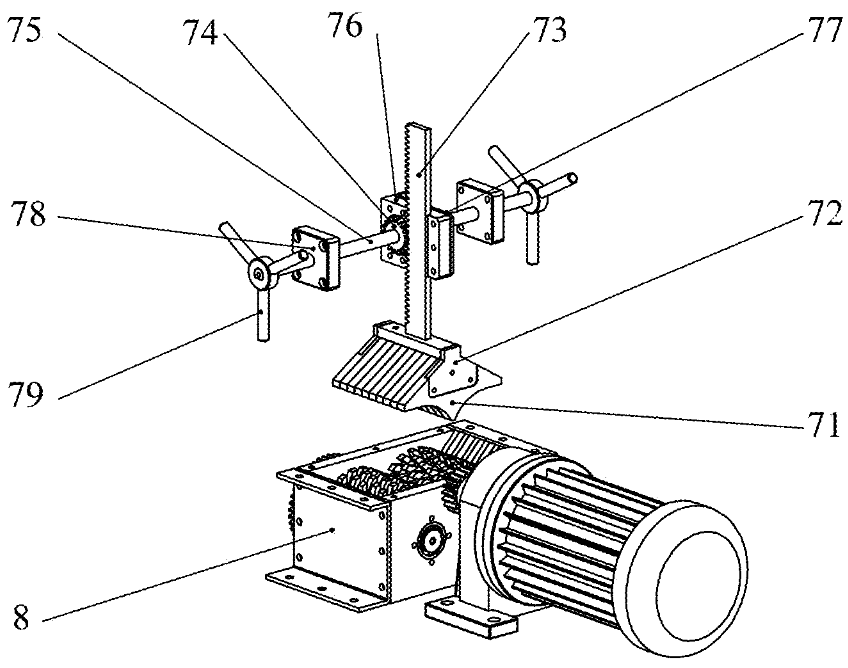
FIG. 7B is a perspective image showing the shape and structure of the garbage compactor unit 7 according to the present invention, in which one side of the guiding box 76 is removed to show the engagement of gear 74 and rack 73.

As shown in FIG. 5, FIG. 5A, and FIG. 5B, garbage receiving unit 5 has the front cover 511 consisting of three flat plates (5111, 5112, and 5113). The middle wall 53 of the garbage receiving unit 5 consists of three flat plates (531, 532 and 533). The garbage receiving unit 5 has the rear cover 510 with the rear cover bracket 5101 for increasing the rigidity of the garbage guiding unit in the garbage compactor unit 7 (FIG. 7E). The support plate 51 that supports the limit switch 43 is fixed onto the rear cover 510.

As shown in FIG. 5, FIG. 5A, and FIG. 5B, the garbage receiving unit 5 has the two side walls 515 and 516. On these two side walls are fixed two support plates 57 which are used for mounting the two rotating supports 78 (refer to FIG. 7) of the garbage compactor unit 7. The two side walls 515 and 516 also have two additional holes 58 for installing the two nozzles 68. The garbage receiving unit 5 is basically made up of the front wall 511, the middle wall 53, the rear cover 510, the side wall 515 and the side wall 516. The garbage receiving unit 5 includes two adjacent compartments: the rear cover 510 and the middle wall 53 combined with two side walls 515 and 516 to form the first compartment; the front cover 511 and the middle wall 53 combine with two side walls 515 and 516 to form the second compartment. These two compartments are adjacent at the outlet 59 located at the bottom of garbage receiving unit 5.

As shown in FIG. 5A and FIG. 5B, the garbage receiving unit 5 has the second compartment as the garbage guiding compartment. This garbage guiding compartment has two parts: the first part has a funnel shape to receive the garbage, the second part being located at the bottom of the garbage receiving unit guides the garbage to the inlet 811 of the crushing unit 8. The flat plate 5113 located at the bottom of the guiding compartment has many small holes 512 allowing the liquid in the garbage to escape to the gutter 513. The liquid trough 513 has rectangular box shape (or any other shape with suitable structure) with its sides fixed to the flat plate 5113. The bottom surface of the liquid trough 513 has the drain pipe 514 connected to the drain pipe 517 (refer to FIG. 10E) to conduct the waste liquid to the waste liquid container 11.

Figure 6:
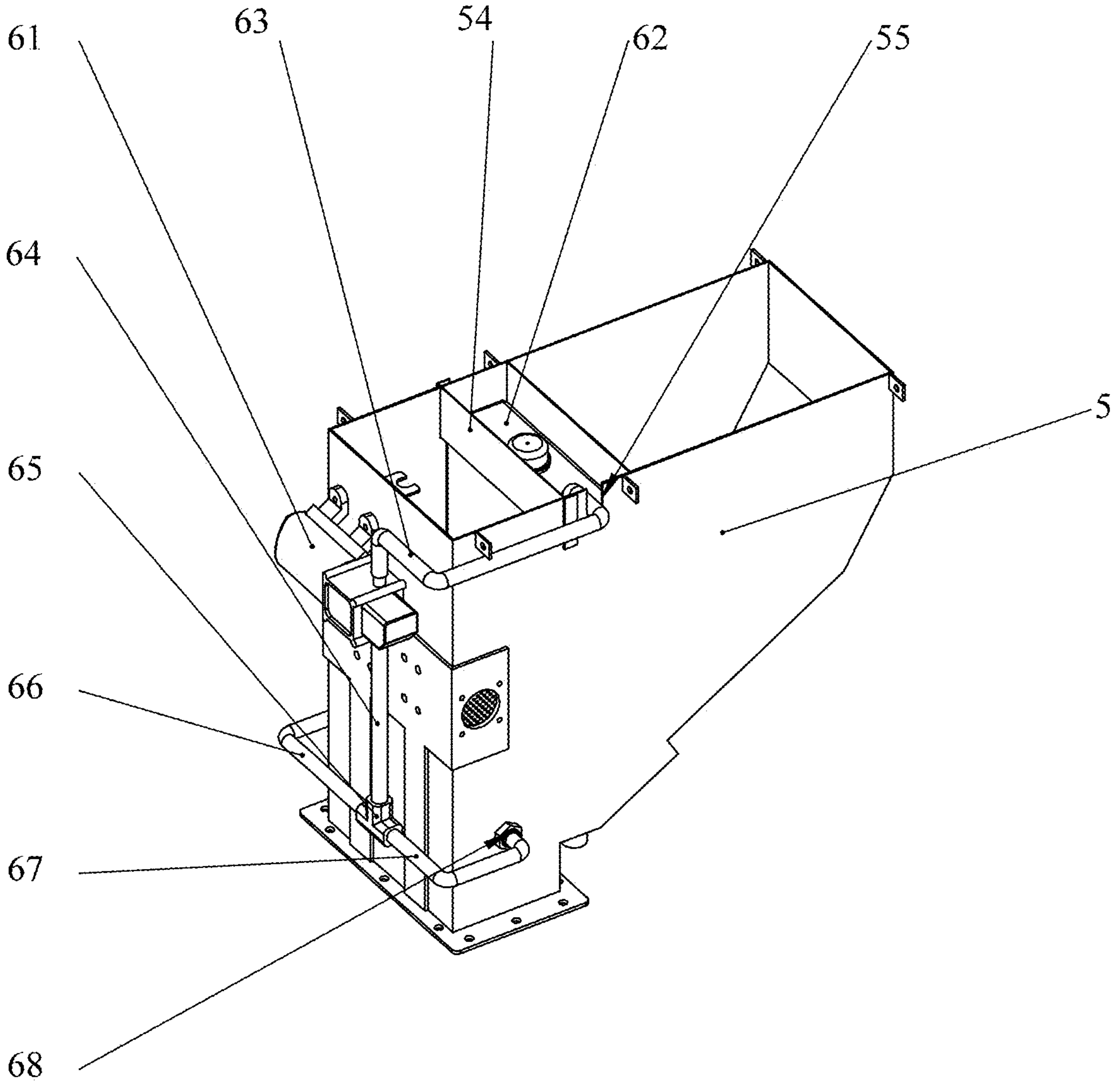
FIG. 6 is a perspective image showing the probiotic pump unit 6 which is mounted on the garbage receiver 5 according to the present invention.
Figure 6A:
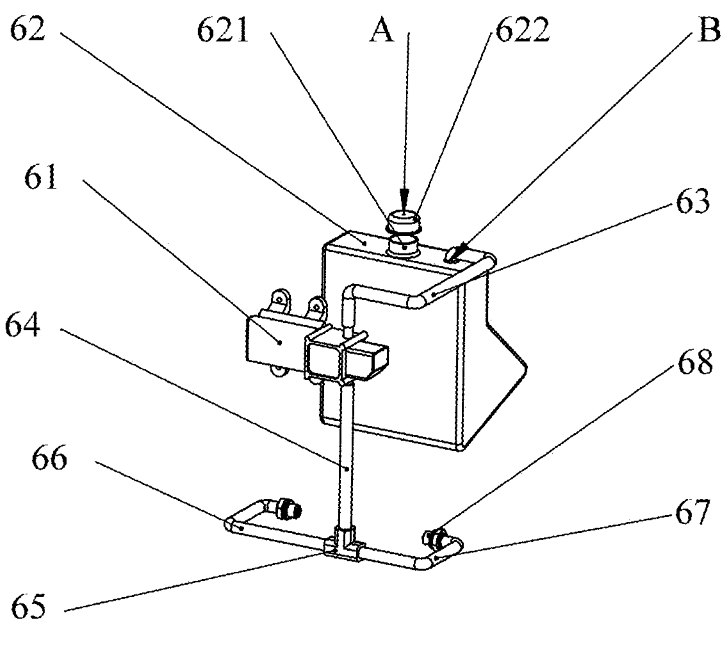
FIG. 6A is a perspective image showing the probiotic pump unit 6 according to the present invention.
Figure 6B:
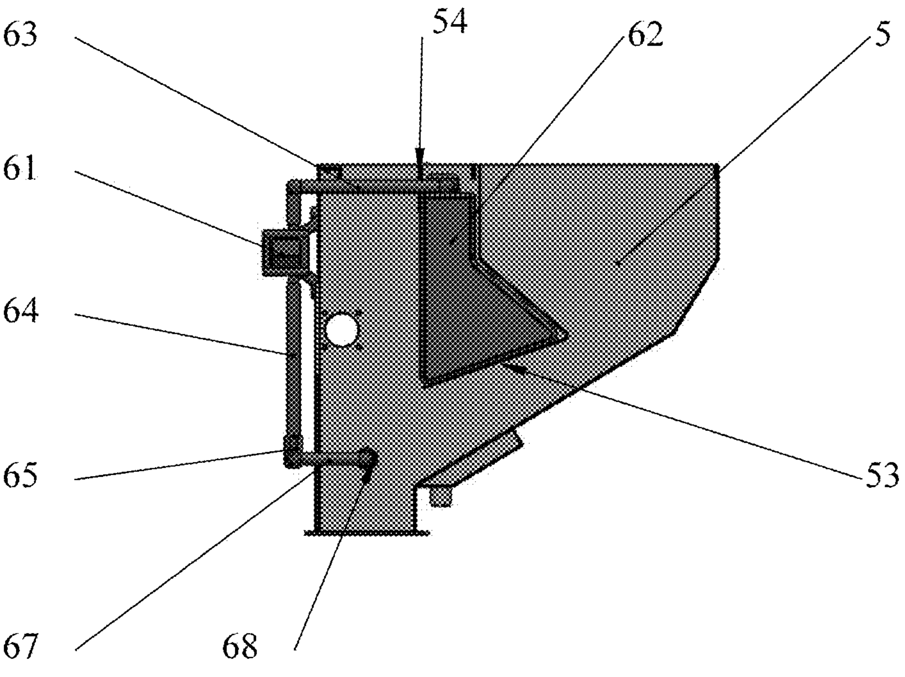
FIG. 6B is the side view showing the probiotic pump unit 6 mounted on the garbage receiving unit 5 according to the present invention.

As shown in FIG. 5, FIG. 6, and FIG. 6B, the shield 54 fits into the slot 56 together with the middle wall 53 which serves to hold the probiotic container 62. The groove 55 on the wall 516 of the garbage receiving unit 5 serves as the drain for the suction pipe 63.

As shown on FIG. 6, FIG. 6A, and FIG. 6B the probiotic spraying unit 6 consists of: the probiotic container 62 with the inlet 621, the cover 622 with the venting hole A, the suction pipe 63 with the inlet fitted into the suction tube mounting hole B, the suction pipe 63 fitted to the probiotic pump inlet 61, the probiotic pipe 64 connecting the probiotic pump outlet 61 to the T-shaped connector 65, the two probiotic conducting pipes 66 and 67 connect the two outputs of the T-shaped connector 65 to the two spray nozzle 68. These two spray nozzles 68 are fixed in two holes 58 (see FIG. 5) on the two walls of the garbage receiving unit 5 to perform the probiotic spray.

As shown on FIG. 7, FIG. 7A, FIG. 7B, and FIG. 7E, the garbage compactor unit 7 consists of: the guiding box 76 that is fixed onto the rear wall 510 of the garbage receiving unit thanks to two angle brackets 77, the rack 73 which can translate vertically, the gear 74 is permanently linked to the gear carrier 75, the two rotating supports 78 that support the two ends of the gear carrier 75, the side walls 515 and 516 where the rotating support 78 being mounted, the gear 74 that engages with the rack 73, the two handwheels 79 which are connected to the gear 74 via the gear carrier 75.

Figure 7C:
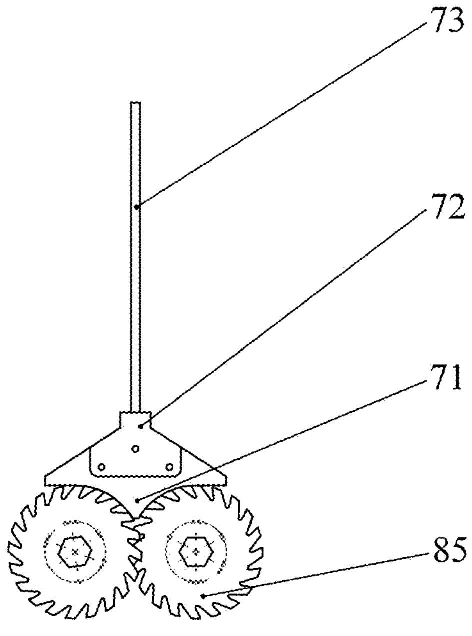
FIG. 7C is the side view showing the outer profile of the garbage presser 71 in accordance with the rotary trajectory of the cutter 85.
Figure 7D:
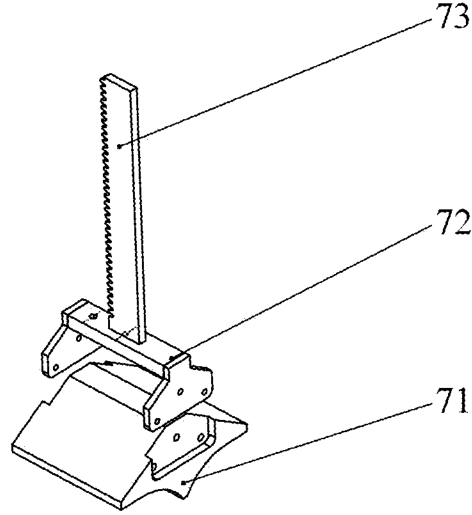
FIG. 7D is a perspective image showing the tight connection of the garbage presser 71 with the garbage presser support 72 and with the rack 73 according to the invention.
Figure 7E:
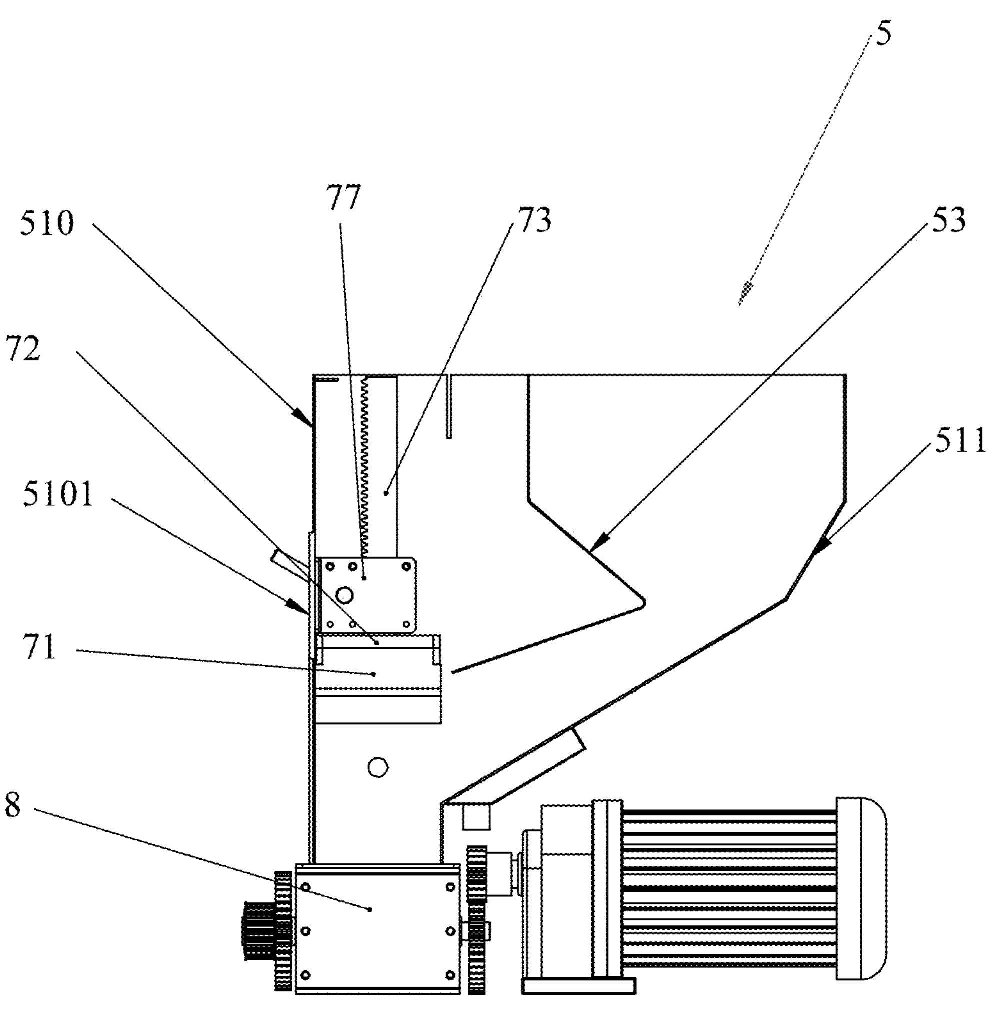
FIG. 7E is the side view of the garbage receiving unit 5 of the present invention with assembled crushing unit 8 and the compactor unit 7 while the garbage presser 71 is in the highest position.

As shown in FIG. 7C and FIG. 7D, the garbage presser support 72 holds the garbage presser 71 at the lower end of the rack 73 using fasteners (e.g., bolts, nuts, screws). The garbage presser 71 has an outer profile adapting to the rotational trajectory of the cutter 85 to ensure that it does not collide with the cutter.

As shown in FIG. 7C, the garbage presser 71 is in the lowest position and is in contact with the cutter 85. As shown in FIG. 7E, the garbage presser 71 is at the highest position. When the garbage presser 71 is in this position, the opening between the garbage presser 71 and the crushing unit inlet 811 of the crushing unit 8 will allow the garbage to be collected from the garbage compartment.

Figure 8:
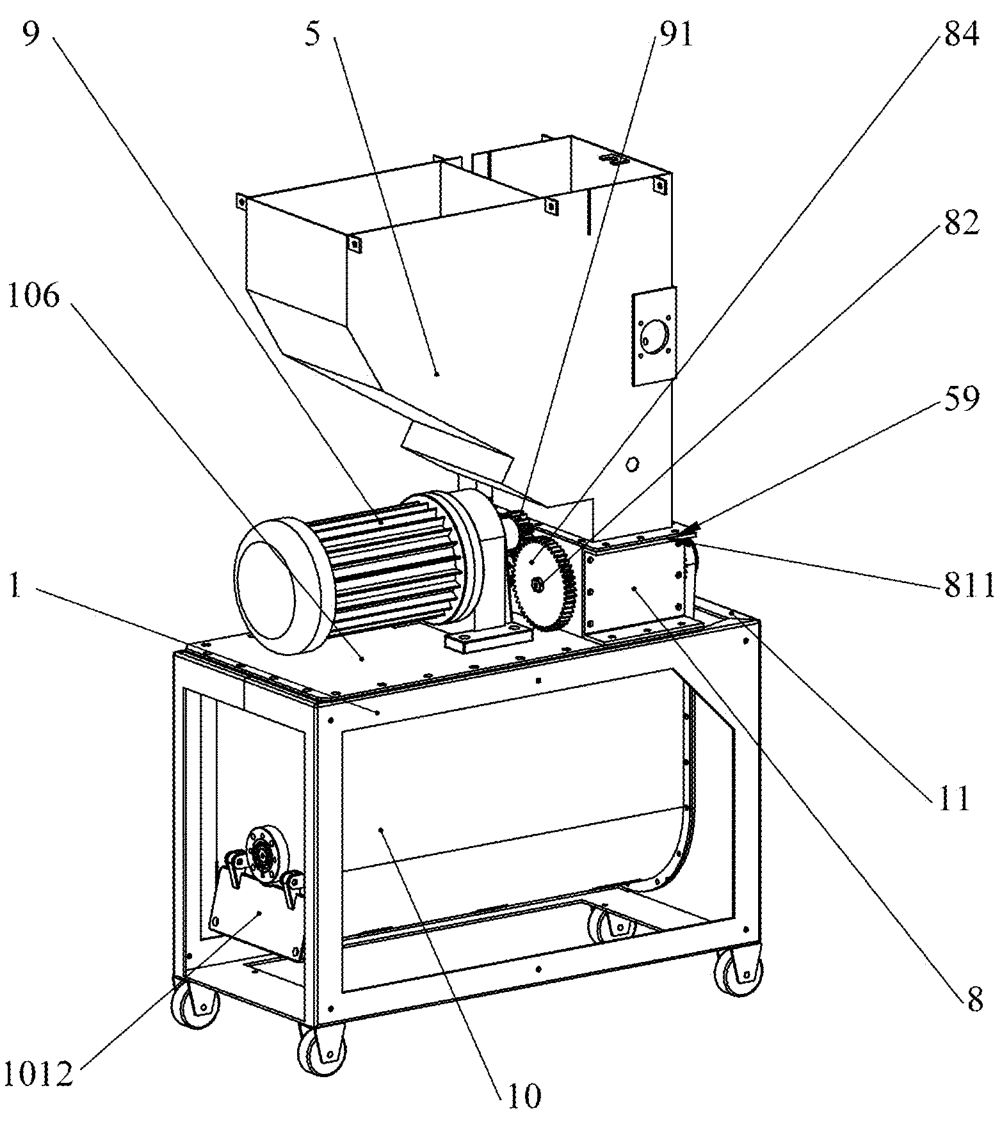
FIG. 8 is a perspective view showing the gear transmission between the motor 9 and the crushing unit 8.

As shown in FIG. 8, the electric motor 9 drives the gear 91. The gear 91 engages the gear 84. The gear 84 is mounted on the driving shaft 82 of the crushing unit 8. The inlet 811 of crushing unit 8 is installed adjacent to the outlet 59 of the garbage receiving unit 5. The mixing unit 10 is located on the structure frame 1 and below the crushing unit 5. The bottom of structure frame 1 has the wheels 2 for easy transportation of the organic waste treatment apparatus.

Figures 8A, 8B:
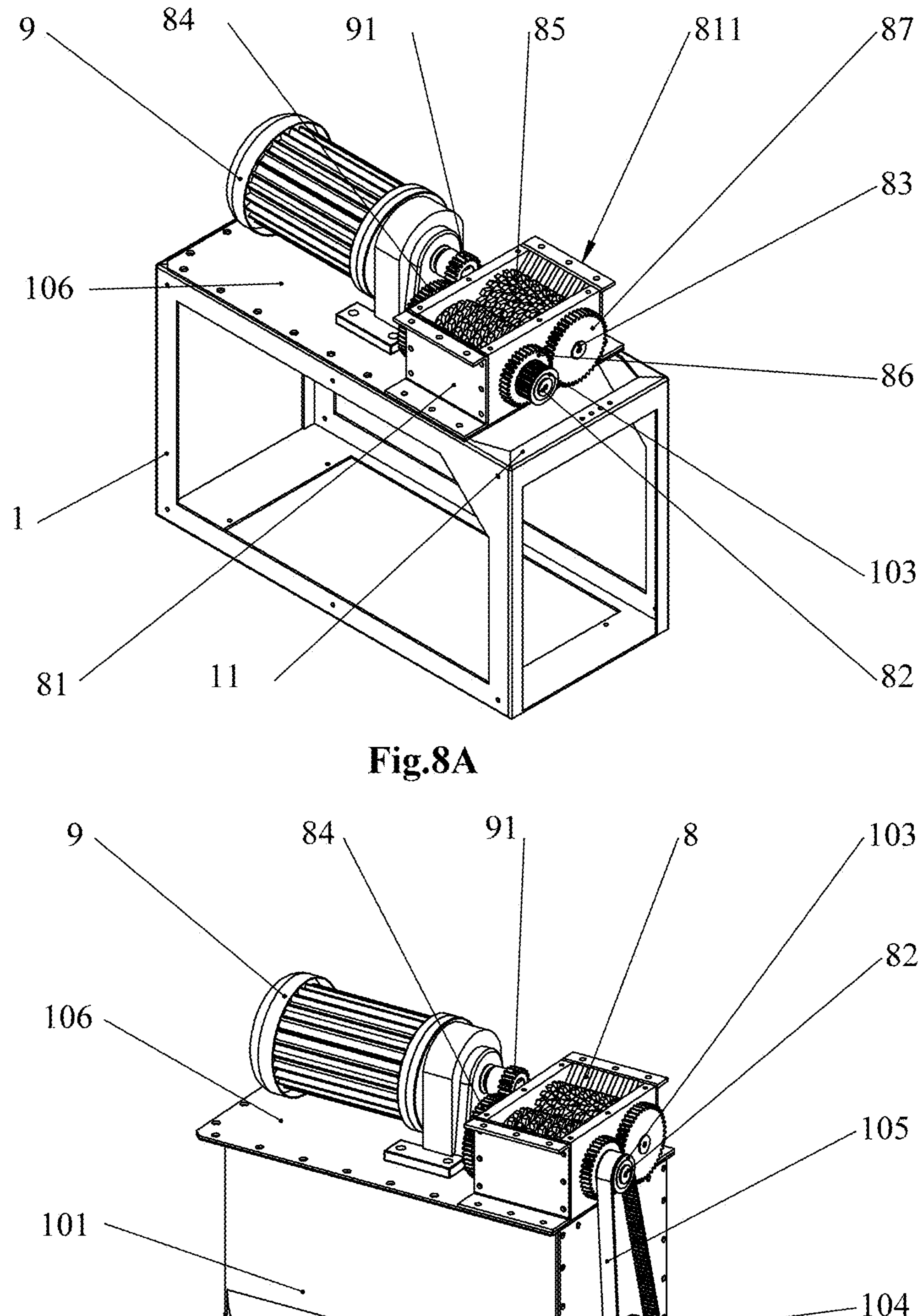
FIG. 8A is a perspective view showing the crushing unit 8 mounted above the structure frame of the present invention.
FIG. 8B is a perspective view showing the crushing unit mounted above the mixing unit, the belt drive and the gear transmission between the crushing unit and the mixing unit of the present invention.

As shown in FIG. 8 and FIG. 8A, the motor 9 and the crushing unit 8 are fixed on the top side 11 of the structure frame 1 through the cover of the mixing compartment 106. The crushing unit 8 includes the crushing chamber 81 and the grinding mechanism arranged inside the crushing chamber. The grinding mechanism consists of the driving shaft 82 and the driven shaft 83 which are mounted horizontally and parallel to each other. These two shafts are supported by structures that are fixed on the walls of the crushing chamber 81. Several cutters 85 are mounted on the driving shaft 82 and on the driven shaft 83 for crushing waste. The drive shaft 82 is driven by the motor 9 through a first gear transmission consisting of the gear 91 and the gear 84. The driving shaft 82 will then drive the driven shaft 83 through the second gear transmission consisting of the drive gear 86 mounted on driving shaft 82 and the driven gear 87 mounted on the driven shaft 83.

Figure 9:
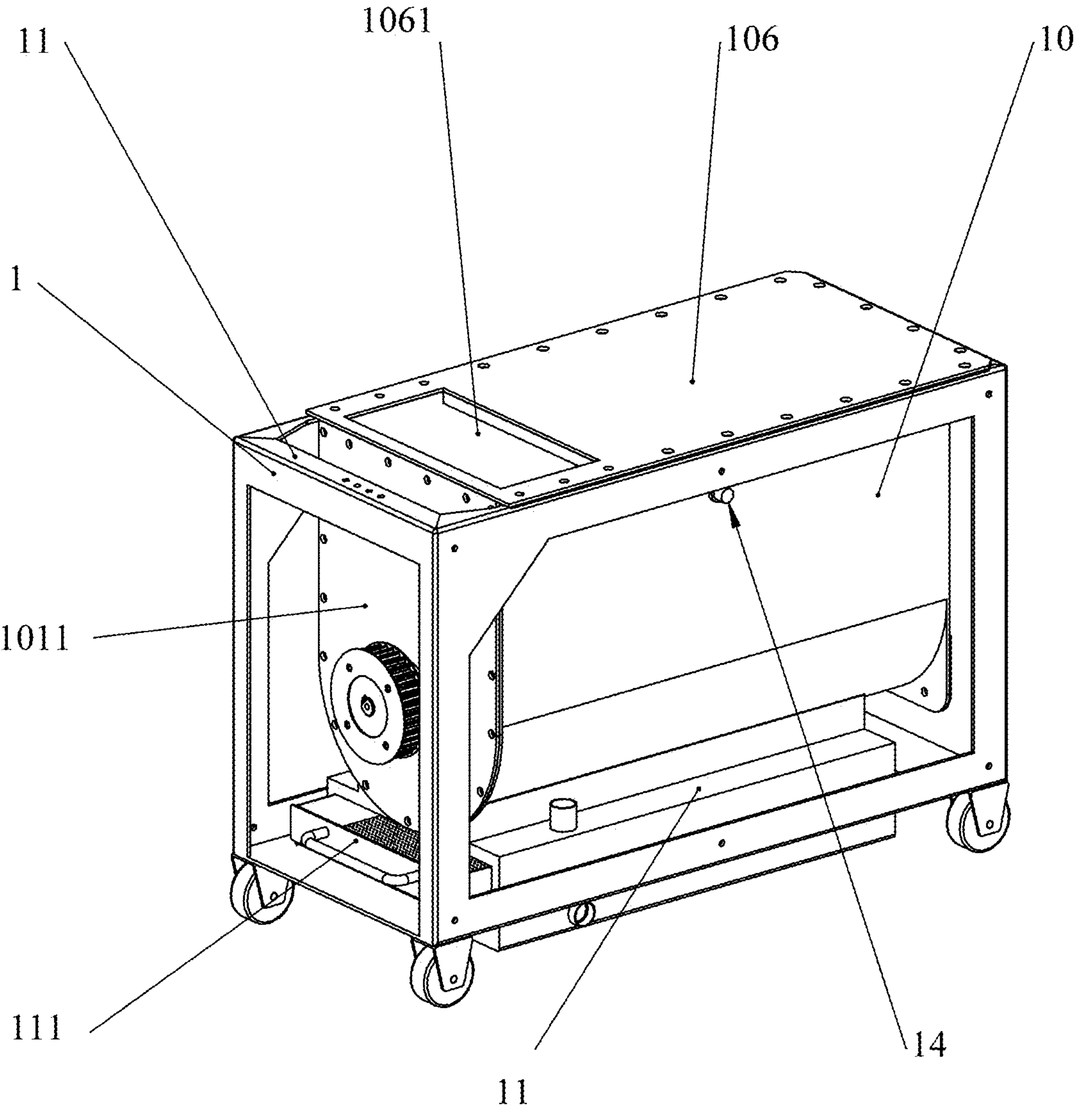
FIG. 9 is a perspective view showing the mixing unit 10 mounted onto the structure frame 1, and the waste liquid container 11 below the mixing unit 10.
Figure 9A:
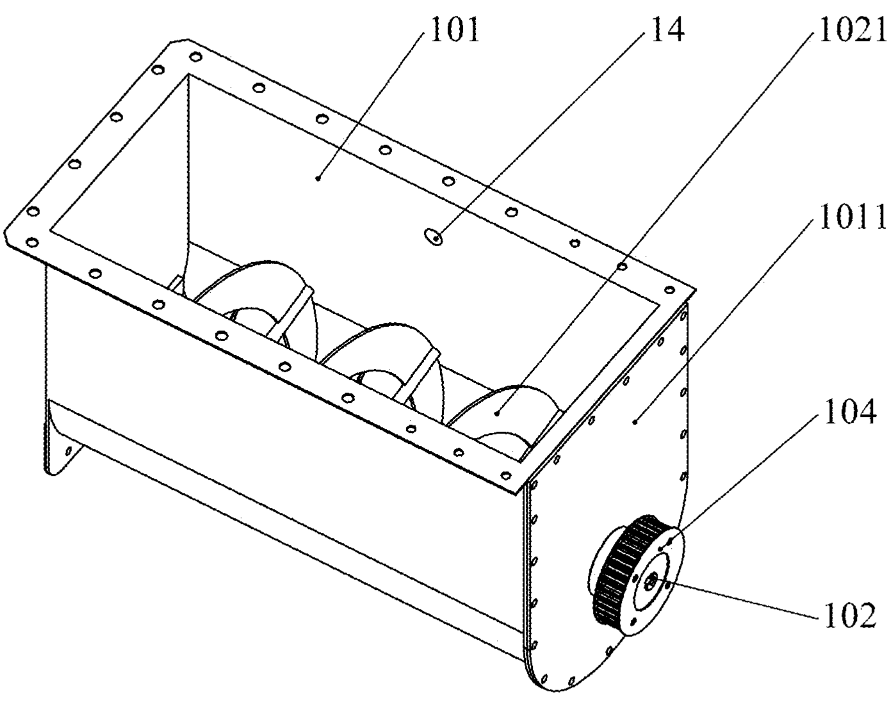
FIG. 9A is a perspective image showing the mixing unit 10 with the cover of the mixing compartment 106 removed, including the mixing compartment 101 with the optical sensor 14 and the mixing shaft 102 according to the present invention.

As shown in FIG. 8B, FIG. 9, and FIG. 9A, the mixing unit 10 is located on the top side 11 of the structure frame 1 and below the crushing unit 8 so that the waste after being crushed falls into the mixing unit 10. The mixing unit 10 consists of: the mixing compartment 101, the mixing shaft 102 with two shaft ends which can rotate on two rotating supports (e.g. two ball bearings or similar structures, not shown in the figures) is fixed on two walls at both ends of the mixing compartment 101, the mixing shaft 102 is driven by the motor 9 through a belt drive consisting of the driving pulley 103, the driven pulley 104 and the belt 105. The driving pulley 103 is mounted on the driving shaft 82 of the crushing unit 8.

As shown in FIG. 9 and FIG. 9A, the wall 1011 on the top of the mixing compartment 101 is designed to be removable to facilitate assembly and repair. This wall can be fixed to the mixing compartment 101 using bolts and nuts, or nails.

As shown in FIG. 8B and FIG. 9, the mixing compartment cover 106 is fixed to the top face of mixing compartment 101 to keep the material (garbage) from spilling out during the mixing. The mixing compartment door 1061 is located on the cover of mixing compartment 106 and directly below the crushing unit 8.

Figure 9B:
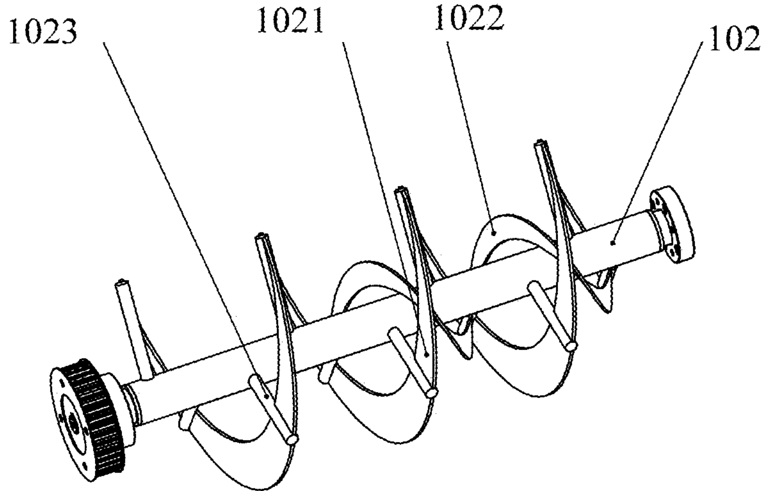
FIG. 9B illustrates the mixer shaft 102 of to the present invention.
Figure 9C:
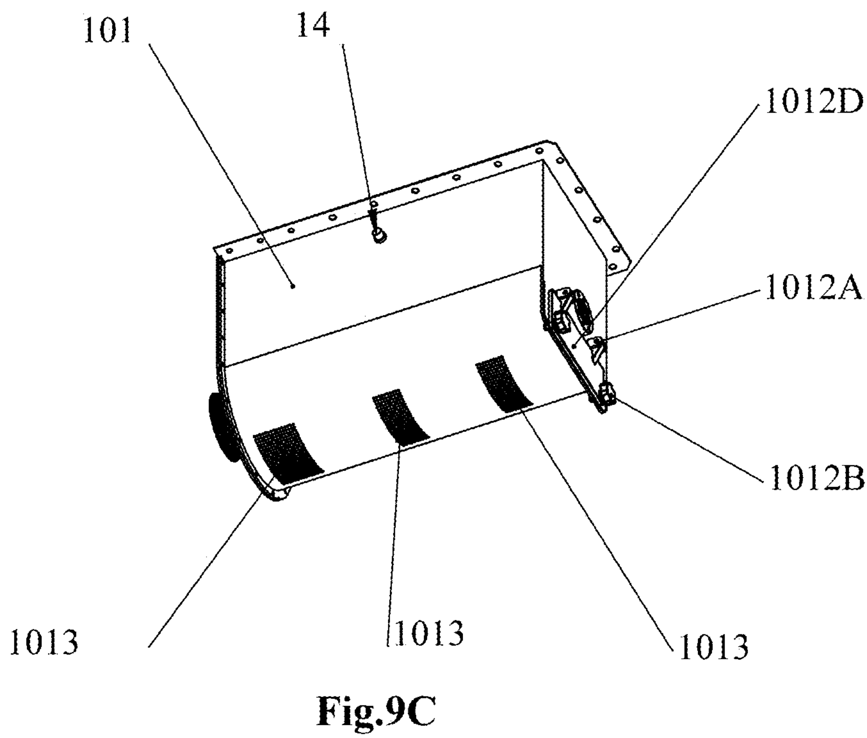
FIG. 9C is the perspective view from below of the mixing compartment 101 showing the shape of the mixing chamber 101, the location of the drain holes cluster 1013, the position of the discharge outlet 1012 in the closed state according to the present invention.
Figure 9D:
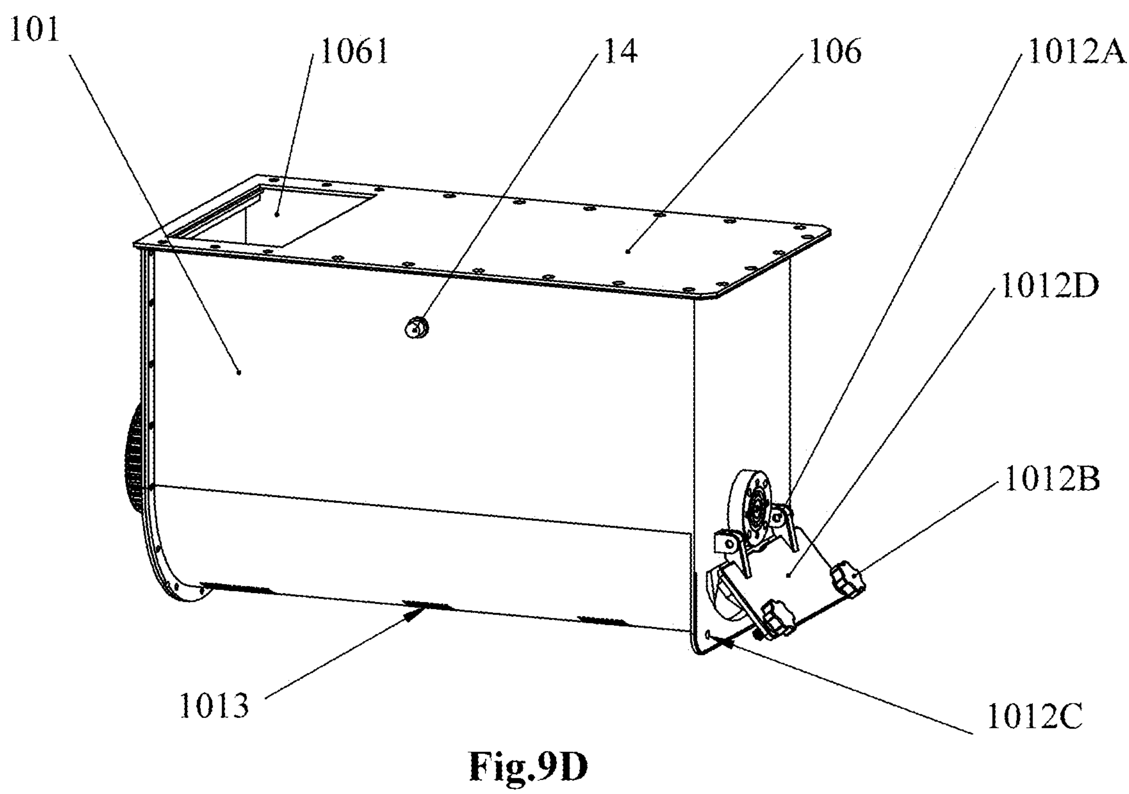
FIG. 9D is a perspective view showing the shape of the mixing compartment 101, the position and structure of the discharge outlet 1012 in open state according to the present invention.

As shown in FIG. 8, FIG. 9C and FIG. 9D, the discharge outlet 1012 is located on the wall at the top of the mixing compartment 101, far away from the mixing compartment door 1061 and the crushing unit 8. The discharge outlet 1012 includes a set of hinges 1012A for opening/closing the discharge outlet cover 1012D, the bolt with knob 1012B and threaded holes 1012C for fastening the discharge outlet cover 1012D to the wall of the mixing compartment 101.

As shown in FIG. 9C, FIG. 9D, the mixing compartment 101 has the curved bottom surface with clusters of tiny drainage holes 1013 along the length of the mixing compartment 101 to allow the liquid in this compartment to drain into the waste liquid container 11 (refer to FIG. 9).

As shown in FIG. 9, FIG. 9C and FIG. 9D, the optical sensor 14 is located on the side of mixing compartment 101 for detecting the level of material in the mixing compartment. The optical sensor 14 is connected to the indicator light 134 on the control panel 13 (refer to FIG. 12) to give warning signals when the material in the compartment reaches a predetermined level. For example, when the material in the compartment reaches a level that can affect the operation of the mixing shaft 102, a warning signal will be shown on the control panel.

As shown in FIG. 9B, the mixing shaft 102 consists of two spiral blades: the outer spiral blade 1021 and the inner spiral blade 1022. These two blades are mounted on the same vertical shaft 1023 but in two opposite directions. When the mixing shaft rotates clockwise, the outer spiral blade 1021 will push the material located in the area near the wall of the mixing compartment in the direction from the side of the crushing unit towards the outlet of the mixing compartment; the inner spiral blade 1022 will push the material located in the area near the center of the mixing shaft in the direction from the side of the discharge port to the side of the crushing unit.

Figure 10:
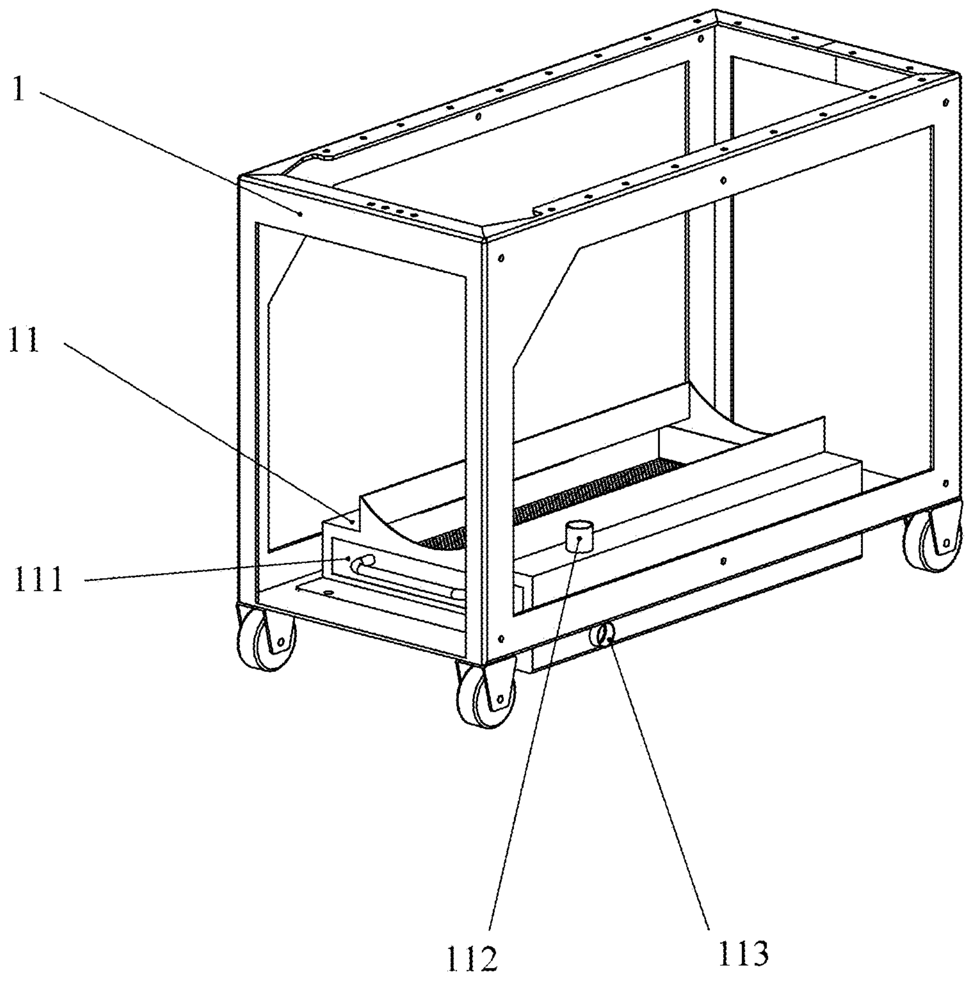
FIG. 10 is a perspective image showing the waste liquid container 11 that is mounted onto the structure frame 1 according to the present invention.
Figure 10A:
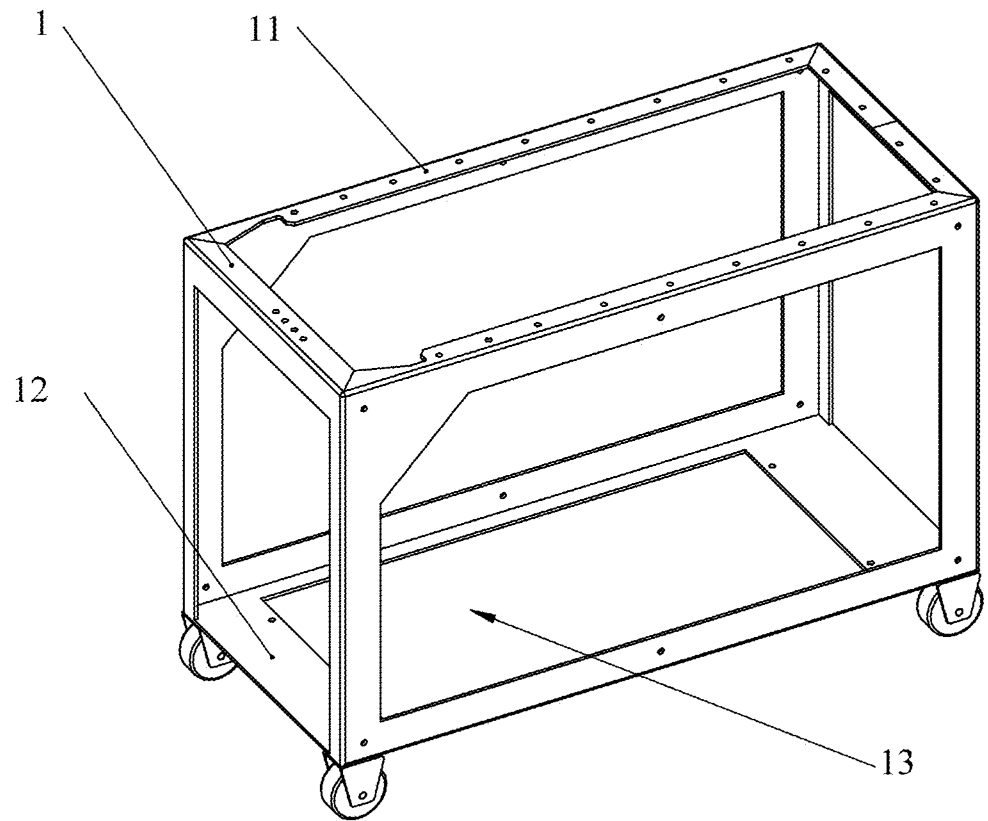
FIG. 10A illustrates the structure of the structure frame 1 according to the present invention.
Figure 10B:
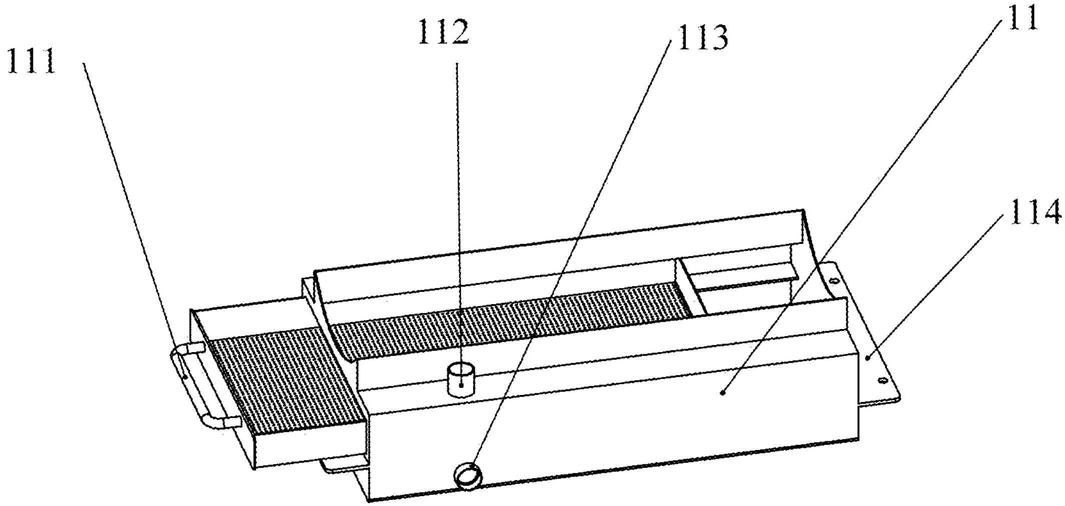
FIG. 10B is a perspective view showing the mesh tray 111 fitted inside the waste liquid container 11 of the present invention.
Figure 10C:
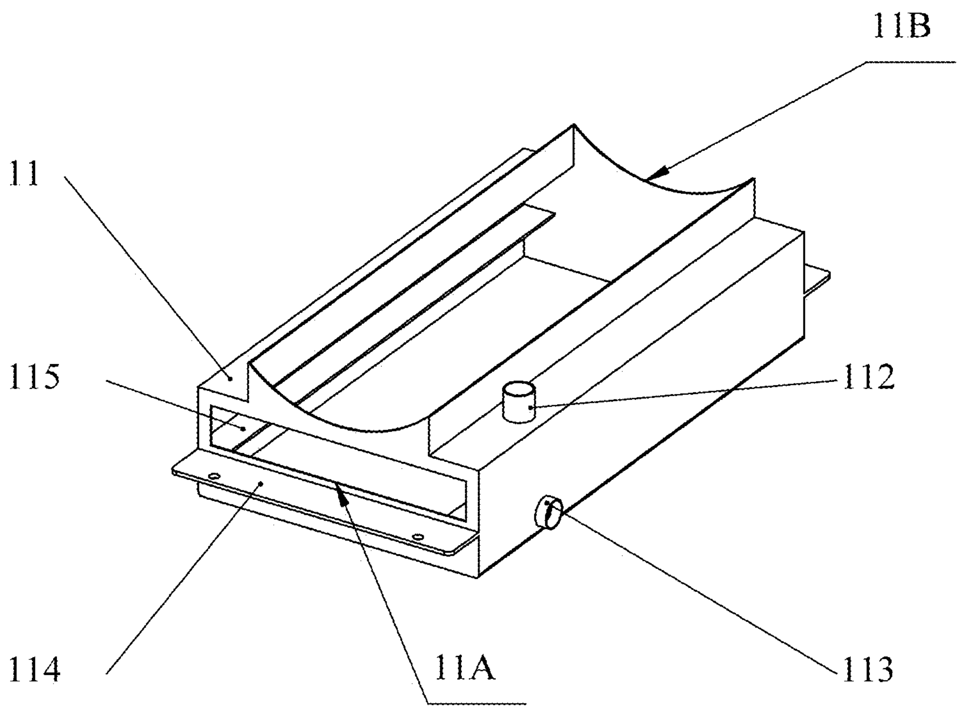
FIG. 10C is a drawing showing the structure of the waste liquid container 11 according to the present invention.

As shown on FIG. 10, FIG. 10A and FIG. 10C, the waste liquid container 11 is placed in the void 13 formed at the bottom 12 of the structure frame 1. The support plate 114 of the waste liquid container 11 is placed on the bottom 12 of structure frame 1. The inlet pipe 112 is connected to the drain pipe 514. The drain pipe 113 of the waste liquid container is used to discharge waste liquid to the outside.

Figure 10D:
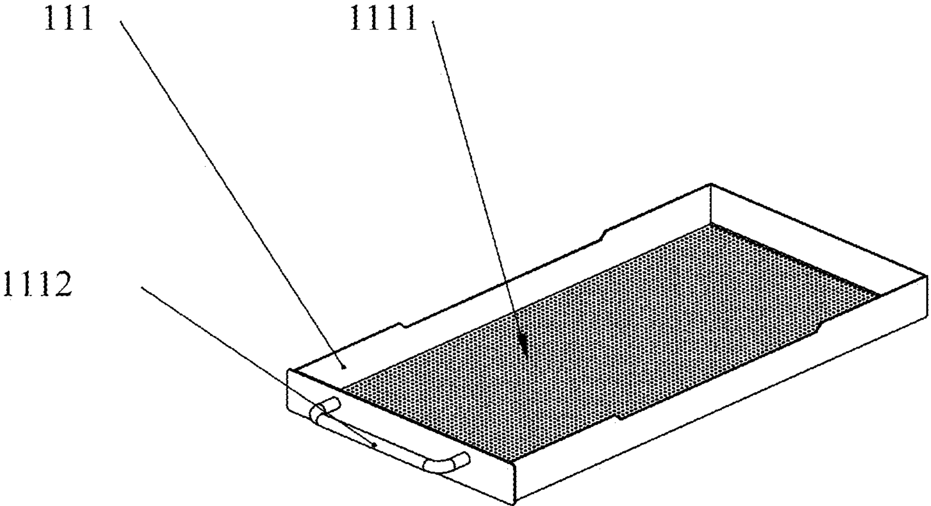
FIG. 10D is an illustration of the structure of mesh tray 111 of the present invention.

As shown on FIG. 10B, FIG. 10C and FIG. 10D, the waste liquid container 11 is designed as a drawer with the top opening 11B (in FIG. 10C). The front side has a rectangle shaped door 11A. Inside this drawer there are the support plate 115 and the mesh tray 111 which is supported by the support plate 115 of the waste liquid container 11. The mesh tray 111 is used for filtering and retaining fine granular materials from the waste liquid.

As shown in FIG. 10B and FIG. 10D, the mesh tray 111 has the bottom surface 1111 as a mesh panel. The handle 1112 is used to pull the mesh tray 111 out of the waste liquid container 11.

Figure 10E:
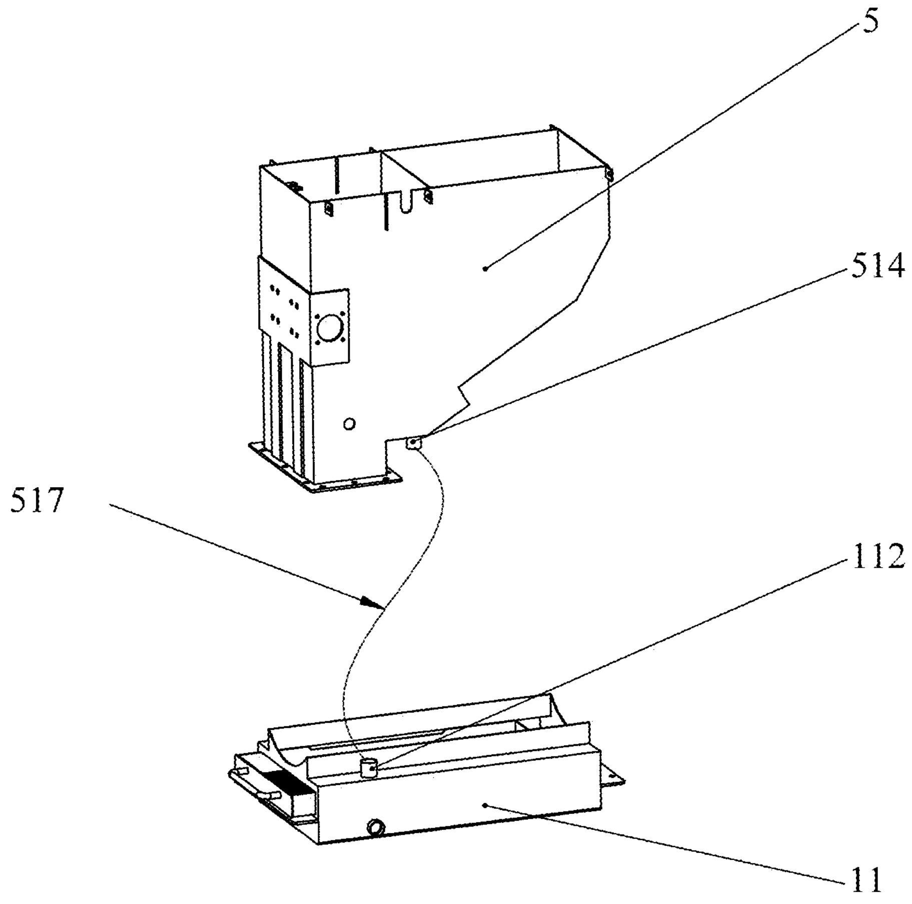
FIG. 10E is an illustration showing the drain pipe 514 of the garbage receiving unit 5 connected to the conducting pipe 112 of the waste liquid container 11 according to the present invention.

As shown in FIG. 10E, the drain pipe 517 is used to connect the drain pipe 514 of garbage receiving unit 5 to the inlet pipe 112 of the waste liquid container 11.

Figure 11:
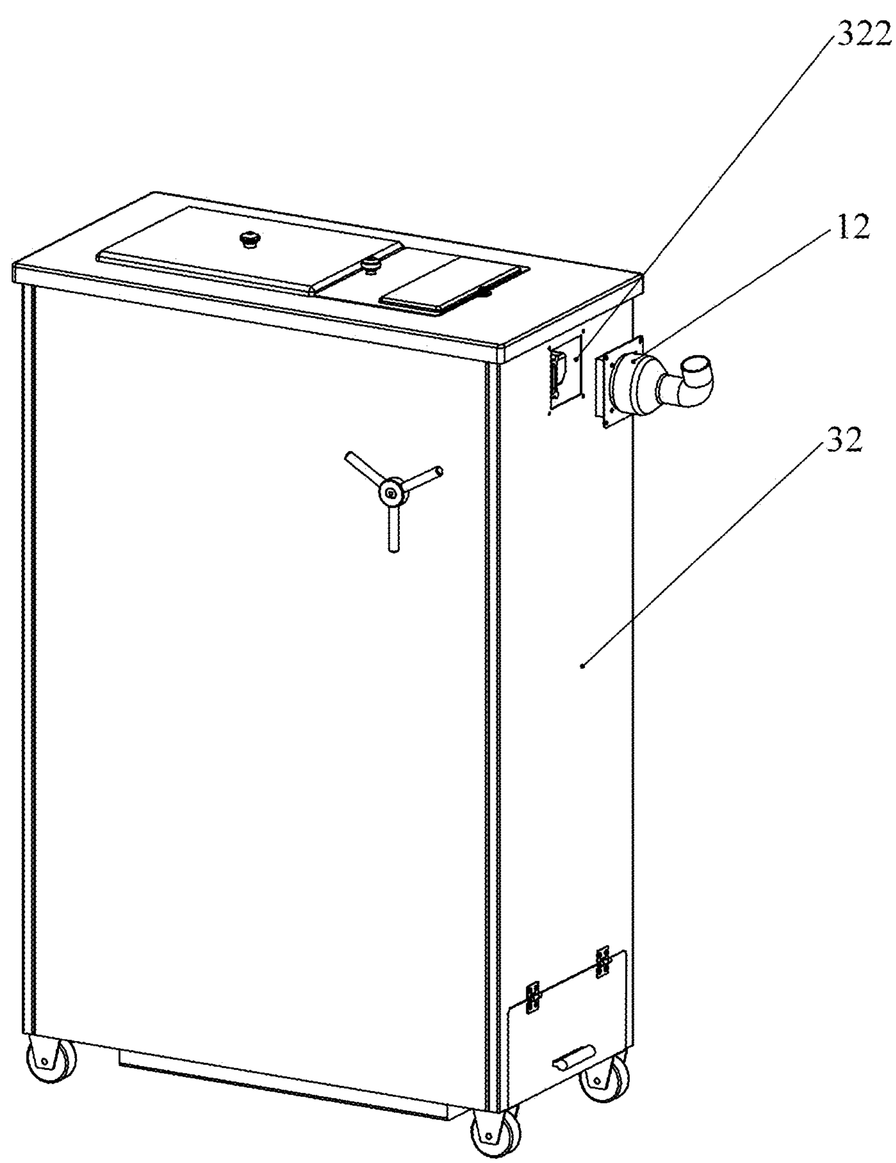
FIG. 11 is a perspective view from the back of the organic waste treatment apparatus, showing the air venting unit 12 and the back cover 32 of the present invention.
Figure 11A:
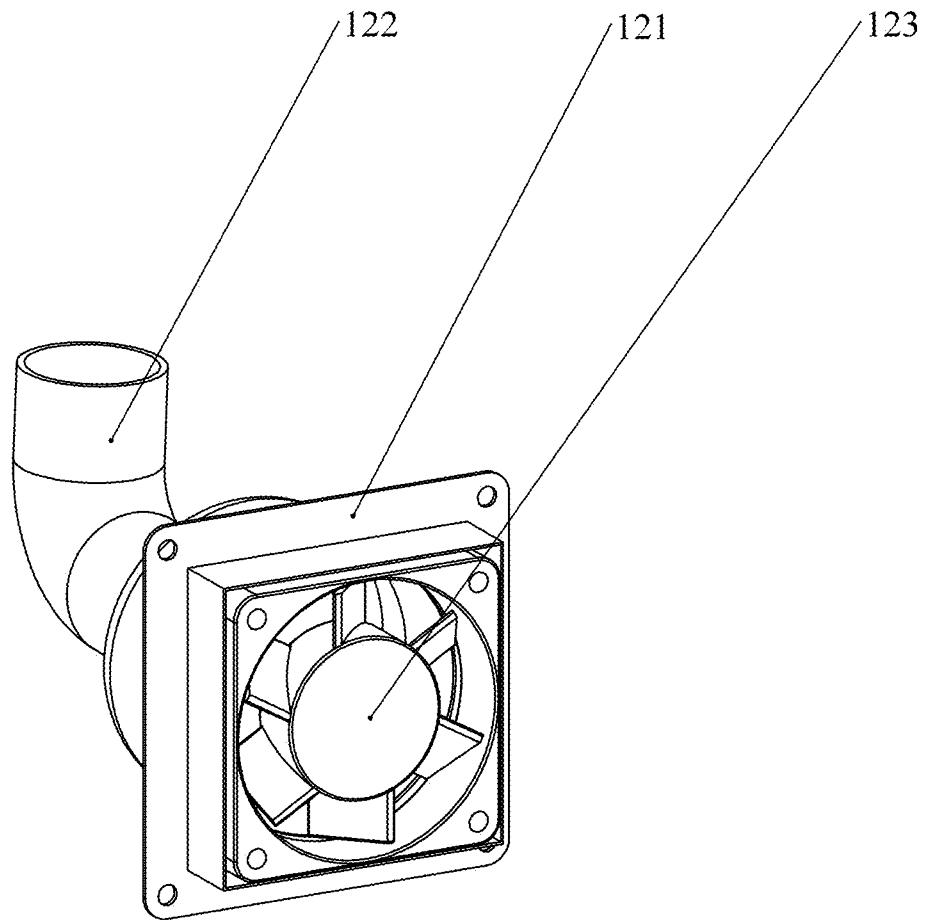
FIG. 11A illustrates the structure of the venting unit including the extracting fan 123, fan support 121, and the exhaust pipe 122.

As shown in FIG. 11 and FIG. 11A, the air venting unit 12 is fitted in the cutout 322 on rear cover 32. The air venting unit 12 includes the mounting bracket 121, the extracting fan 123, and the exhaust pipe 122.

In accordance with some specific embodiments of the present invention, a negative ion emitter (not shown) may be located at several suitable locations in the organic waste treatment apparatus to remove odors from the generated gas during the decomposition process before being vented. For example, negative ion generators can be placed near locations that are frequently accessed by users, such as: the entrance of the garbage receiving unit 5, the front door 311, the rear door 321.

Figure 12:
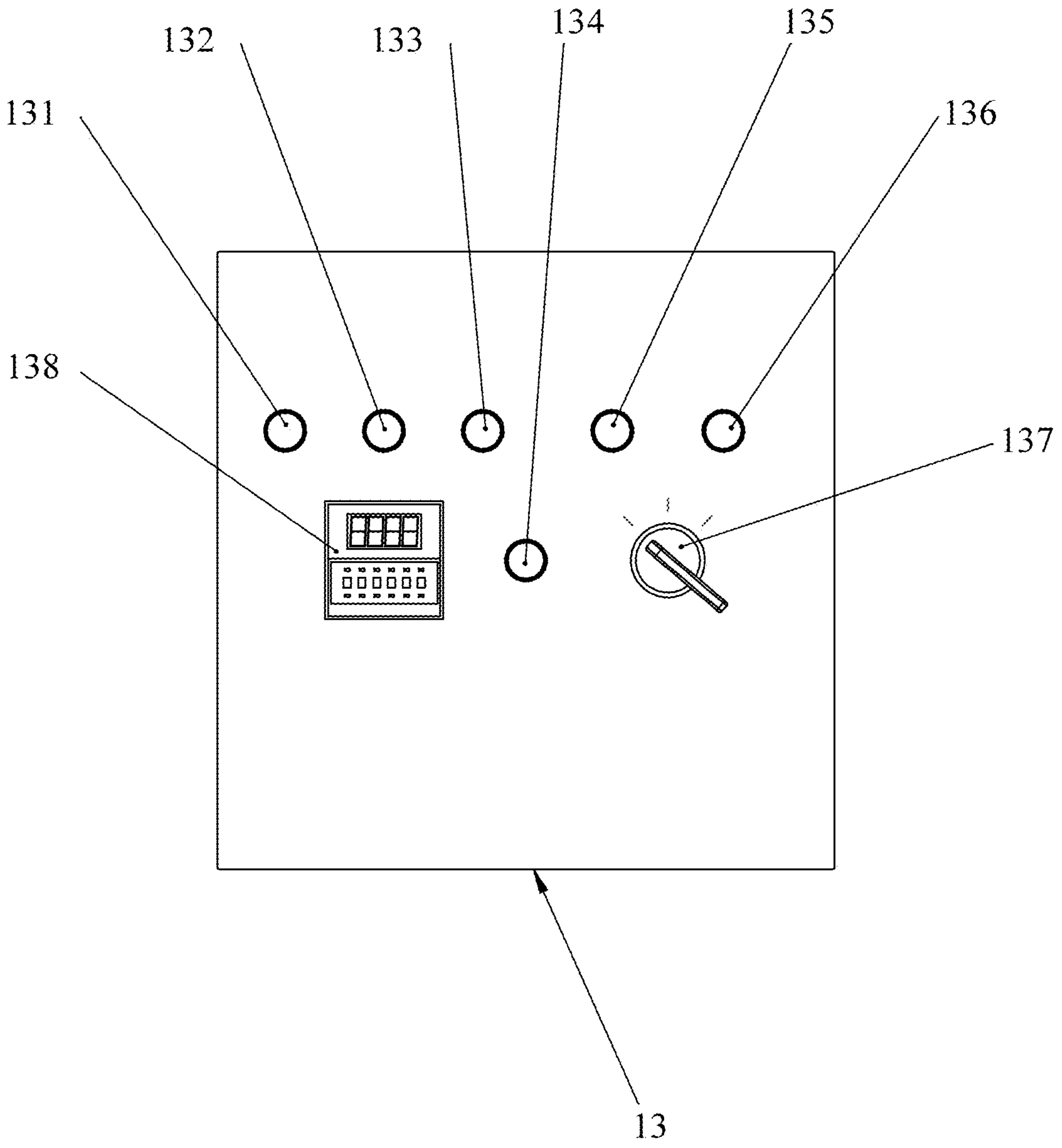
FIG. 12 is a drawing showing the details on the control panel 13 including: the power on button 131 and the power off button 132 for turning on/off the said apparatus, the probiotic pump control button 133, the exhaust fan on-off button 135, the negative ion generator on-off button 136, the indicator light 134 for indicating when the material in the mixing chamber reaches a predetermined level, the rotary switch 137, and the timer 138.

As shown in FIG. 12, the control panel 13 includes the power on button 131, the power off button 132, the probiotic pump control button 133, the venting fan on-off button 135, the negative ion generator on-off button 136, the indicator light 134 to indicate that the material in the mixing chamber has reached a predetermined level.

As shown in FIG. 12, the control panel 13 also includes the rotary switch 137 with three positions (three dashes near the rotary switch) corresponding to three functions. The first position on the left controls the motor to perform the crushing or discharging function, the second position in the middle controls the motor to perform the periodic mixing function, and the third position on the right stops the motor 9.

As shown in FIG. 12, the control panel 13 also includes the timer 138 which is used to set the duration of the mixing cycle including mixing time and standby time.

As shown in FIG. H3, FIG. H8B, FIG. H9A, and FIG. 12, when the rotary switch 137 is in the first position, the motor 9 will rotate so that the driving shaft 82 and the driven shaft 83 of the crushing unit 8 rotates in opposite directions to perform the crushing function. The mixing shaft 102 also rotates in the direction that the outer spiral blade 1021 will send the crushed waste towards the discharge outlet 1012 of the mixing compartment 101, which is in the closed state.

As shown in FIG. 3, FIG. 8B, FIG. 9A, and FIG. 12, when the rotary switch 137 is in the first position, the motor 9 will rotate so that the driving shaft 82 and the driven shaft 83 of the crushing unit 8 rotate in opposite directions. The mixing shaft 102 also rotates in the direction that the outer spiral blade 1021 will bring the crushed waste towards the discharge outlet 1012 of the 101 mixing compartment. In order to perform the discharge function, the discharge outlet 1012 will be left open.

The motor 9 with reversing function is equipped with a magnetic starter, a current sensor, a revolution counter (not shown on the figures), a timer to be able to perform crushing function, discharge function and periodic mixing function.

The probiotic pump 61 is equipped with a magnetic starter, a timer (not shown on the figures), which performs the function of injecting probiotics and automatically turns off after a predetermined interval. The determination of the injection time will be based on the amount of probiotics to be pumped and the pump capacity.

The operating principle of the organic waste treatment apparatus of the present invention is shown below, with reference to FIG. 3.

First of all, liquid probiotics will be loaded into the probiotic container 62 with a concentration (see probiotic manufacturer's instructions) sufficient to handle a full batch of waste in the mixing compartment 101. This volume of probiotics will be calculated depending on the capacity of the mixing compartment 101. Determining the amount of probiotics to be injected will depend on the amount of garbage put in and the time the pump is in operation. The button 131 is used to turn on the apparatus. The button 135 is used to turn on the venting fan. And the button 136 is used to turn on the negative ion generator.

When the organic waste is introduced into the garbage compartment for entering the crushing unit 8, the liquid mixed in the waste, if any, will flow along the bottom of the flat plate 5113 into the liquid trough 513 and then along the drain pipe 517, and finally into the waste liquid container 11 (refer to FIG. 5A and FIG. 10E). Pressing the control button of the probiotic pump 133 and turning the rotary switch 137 to the first position for the device to perform the function of crushing organic waste. Turning the handwheel 79 to press down the garbage presser 71, thus pressing the waste towards the cutters of the crushing unit 8. The driving shaft 82 of the crushing unit 8 will drive the mixer shaft 102 through a belt (refer to FIG. 8B). The garbage after being crushed will automatically fall into the mixing compartment 101. At this stage, the liquid generated from the organic waste is drained into the waste liquid container 11 (refer to FIG. 9). This liquid will flow through the drain pipe 113 to drain or to be collected as liquid fertilizer. The mixture of crushed organic waste and probiotics in the mixing compartment 101 will be pushed by the mixing shaft 102 towards the discharge outlet 1012. At this stage, the discharge outlet is closed.

If the rotary switch 137 points at the third position, the motor 9 will stop. If the rotary switch 137 is at the second position, the apparatus will perform a periodic mixing in order to speed up the decomposition of the waste. Liquid, methane (CH4) and ammonia (NH3) will be separated from the garbage.

According to a specific example of the present invention, turning rotary switch 137 to the second position to initiate a periodic mixing function consisting of the following operations: the mixing shaft rotates five revolutions clockwise, then automatically reverse the rotation of five revolutions counterclockwise, and so on. This will be repeated for five minutes and then stop for one hour. The apparatus will then automatically repeat the next mixing cycle until the rotary switch 137 is turned to the third position to stop.

In case the mixing compartment 101 is filled with garbage to a predetermined level that can be detected by the optical sensor 14, the indicator light 134 will light up to warn the user to take out the compost mixture. Turning the rotary switch 137 to the first position will turn on the motor 9. The mixing shaft 102 will rotate to push the manure mixture towards the discharge outlet 1012 which is opened to push the manure mixture out for storage and composting.

REFERENCE SIGNS LIST

1: structure frame
11: top side
12: bottom side
13: void
2: wheel
3: covers (31, 32, 33, 34)
31: front cover
311: front door
32: rear cover
321: rear door
322: cutout
33: right cover
34: left cover
4: top cover
41: cover
411: handle (of cover)
42: probing door
421: transparent glass panel
422: handle (of the probing door)
423: hinge
423A: swinging leaf
423B: fixed leaf
423C: hinge pin
43: limit switch
431: limit switch button
44: hole
45: bracket
5: garbage receiving unit
51: support plate
52: bracket
53: middle wall
531, 532, 533: three flat plates of the middle wall
54: shield
55: groove
56: slot
57: support plates for mounting the rotating supports
58: holes for mounting two nozzles
59: outlet of the garbage receiving unit
510: rear cover
5101: rear cover bracket
511: front cover
5111, 5112, 5113: three flat panels of front cover
512: small holes at the bottom of the garbage guiding unit
513: liquid trough
514: drain pipe
515, 516: side walls
517: drain pipe
6: probiotic spray unit
61: probiotic pump
62: probiotic container
621: probiotic container inlet
622: cover
A: air outlet
63: suction pipe
B: suction pipe mounting hole
64: probiotic conducting pipe
65: T shaped connector
66, 67: probiotic conducting pipes
68: nozzles
7: garbage compactor unit
71: garbage presser
72: garbage presser support
73: rack
74: gear
75: the gear carrier

76: guiding box
77: angle bracket
78: rotating support
79: handwheel
8: crushing unit
81: crushing chamber
811: crushing unit inlet
82: driving shaft of the crushing unit
83: driven shaft of the crushing unit
84 and 91: gears of first gear transmission
85: cutter
86: driving gear of second gear transmission
87: driven gear of the second drive driven gear
9: motor
10: mixing unit
101: mixing compartment
1011: wall on the top of the mixing compartment
1012: discharge outlet
1012A: hinge
1012B: bolt with knob
1012C: threaded hole
1012D: discharge outlet cover
1013: drain holes cluster
102: mixing shaft
1021: outer spiral blade
1022: inner spiral blade
1023: vertical shaft
103: driving pulley
104: driven pulley
105: belt
106: mixing compartment cover
1061: mixing compartment door
11: waste liquid container
111: mesh tray
1111: bottom surface of the mesh tray
1112: handle to pull the mesh tray
112: inlet pipe
113: drain pipe
114, 115: support plate of the sewage tank
11A: rectangle-shaped door
11B: top opening
12: air venting unit
121: mounting bracket
122: exhaust pipe
123: extracting fan
13: control panel
131: power on button
132: power off button
133: probiotic pump control button
134: indicator light
135: venting fan on-off button
136: negative ion generator on-off button
137: rotary switch
138: timer
14: optical sensor

The invention claimed is:

1. An apparatus for organic waste treatment, the apparatus comprising:
- a garbage receiving unit including at least two compartments and a garbage compactor unit, the at least two compartments including:
  - a first compartment configured to host the garbage compactor unit; and
  - a second compartment configured to receive an organic waste and to provide the organic waste to the garbage compactor unit where the organic waste is compacted to generate a compacted organic waste;
- a motor;
- a crushing unit configured to receive the compacted organic waste from the second compartment, the crushing unit including:
  - a crushing chamber configured to receive the compacted organic waste,
  - a driving shaft positioned at least partially in the crushing chamber,
  - a driven shaft positioned at least partially in the crushing chamber,
  - a first gear transmission mechanically coupling the driving shaft with the motor,
  - a second gear transmission mechanically coupled with the driving shaft and the driven shaft, and
  - one or more cutters at least partially positioned in the crushing chamber, wherein the one or more cutters are mounted adjacent the driving shaft and the driven shaft, and wherein the one or more cutters are configured to crush the compacted organic waste to form a crushed organic waste; and
- a mixing unit configured to receive the crushed organic waste from the crushing unit, the mixing unit including:
  - a mixing compartment configured to receive the crushed organic waste; and
  - a mixing shaft configured to be driven by the motor and configured to access the crushed organic waste of the mixing compartment, wherein the mixing shaft is configured to provide the crushed organic waste to a discharge outlet, wherein the discharge outlet is configured to discharge the crushed organic waste from the apparatus.

2. The apparatus of claim 1, wherein the first gear transmission is indirectly mechanically coupled with the driving shaft and the motor.

3. The apparatus of claim 1, wherein the second gear transmission is indirectly mechanically coupled with the driving shaft.

4. The apparatus of claim 1, further comprising a top cover having a probing door covering an upper inlet of the first compartment.

5. The apparatus of claim 1, wherein the mixing unit is positioned underneath the crushing unit.

6. The apparatus of claim 1, wherein the motor comprises a reversible rotation function, a magnetic stirrer, a current sensor, a rev counter, and a timer.

7. The apparatus of claim 1, wherein the garbage compactor unit comprises:
- a guiding box configured to guide a rack in a vertical motion;
- a gear carrier comprising two shaft ends mounted on two rotating supports;
- a gear fixed to the gear carrier;
- the rack configured to move in tandem with the gear;
- at least two handwheels configured to control rotation of the gear for moving the rack vertically; and
- a garbage presser.

8. The apparatus of claim 1 further comprising a probiotic spray unit configured to spray probiotics on the organic waste.

9. The apparatus of claim 8, wherein the probiotics are sprayed when the organic waste is compacted.

10. The apparatus of claim 8, wherein the probiotics are sprayed when the organic waste is crushed.

11. The apparatus of claim 8, wherein the probiotic spray unit includes:
- a probiotic container positioned in or adjacent the first compartment of the garbage receiving unit;

a suction pipe for suctioning the probiotics from the probiotic container to a probiotic pump; and at least two nozzles in fluid communication with an output of the probiotic pump to provide the probiotics to the organic waste.

12. The apparatus of claim 1, wherein the garbage receiving unit is funnel-shaped and includes a plurality of small holes, wherein the garbage receiving unit is configured to extract liquid in the organic waste, wherein the liquid is delivered to a waste liquid container via a drain pipe.

13. The apparatus of claim 1 further comprising a venting unit that includes an exhaust fan and an exhaust pipe configured to carry emissions outside of the apparatus, wherein the emissions are generated during decomposition of the crushed waste.

14. The apparatus of claim 1, wherein the mixing shaft includes an outer spiral blade and an inner spiral blade, wherein the outer spiral blade and the inner spiral blade are each mounted on a shaft, and wherein, when the mixing shaft rotates clockwise, the outer spiral blade is configured to push the crushed organic waste from the crushing unit to the discharge outlet of the mixing compartment, and the inner spiral blade is configured to push the crushed organic waste located near a center of the mixing shaft towards the crushing unit.

15. The apparatus of claim 1 further comprising a control panel that includes:

a power button configured to switch the apparatus on and off, a selectable switch with three positions:

a first position configured to control the motor to crush the compacted organic waste or discharge the crushed organic waste, a second position configured to control the motor to mix the crushed organic waste, and a third position configured to stop the motor;

a button configured to control a probiotic pump;

a button configured to control a venting fan; and an indicator light configured to light up when a volume of the crushed organic waste in the mixing compartment reaches a predetermined level.

16. The apparatus of claim 15 further comprising an optical sensor located in the mixing compartment and an indicator light on the control panel that is responsive to the optical sensor, wherein the optical sensor is configured to give a warning signal when a volume of the crushed organic waste in the mixing compartment reaches a predetermined level.

17. An apparatus for organic waste treatment, the apparatus comprising:

a garbage receiving unit including at least two compartments and a garbage compactor unit, the at least two compartments including:

a first compartment configured to host the garbage compactor unit; and a second compartment configured to receive an organic waste and to provide the organic waste to the garbage compactor unit where the organic waste is compacted to generate a compacted organic waste;

a motor configured with a reversible rotation function, and wherein the motor includes a magnetic starter, a current sensor, a rev counter, and a timer;

a crushing unit configured to receive the compacted organic waste from the second compartment, the crushing unit including:

a crushing chamber configured to receive the compacted organic waste;

a driving shaft;

a first gear transmission connecting the driving shaft to the motor;

a driven shaft mounted horizontally and parallel to the driving shaft;

a second gear transmission connecting the driving shaft to the driven shaft; and one or more cutters mounted on the driving shaft and the driven shaft, wherein the garbage compactor unit presses the compacted organic waste into the one or more cutters, and wherein the one or more cutters are configured to crush the compacted organic waste to form a crushed organic waste;

a mixing unit underneath the crushing unit, the mixing unit being configured to receive the crushed organic waste from the crushing unit, the mixing unit including:

a mixing compartment configured to receive the crushed organic waste;

a mixing compartment cover positioned on top of the mixing compartment;

a mixing compartment door located on the mixing compartment cover; and a mixing shaft connected to the motor, wherein the mixing shaft is configured to push the crushed organic waste to a discharge outlet located on a wall of the mixing compartment; and a control panel configured to control operation of the motor.

18. An apparatus for organic waste treatment, the apparatus comprising:

a garbage receiving unit including at least two compartments and a garbage compactor, the at least two compartments including:

a first compartment configured to host the garbage compactor unit; and a second compartment configured to receive an organic waste and to provide the organic waste to the garbage compactor where the organic waste is compacted to generate a compacted organic waste;

a probiotic spray unit configured to spray probiotics on the organic waste;

a motor;

a crushing unit configured to receive the compacted organic waste from the second compartment, the crushing unit including:

a crushing chamber configured to receive the compacted organic waste, a driving shaft positioned at least partially in the crushing chamber, a driven shaft positioned at least partially in the crushing chamber, a first gear transmission mechanically coupling the driving shaft with the motor, a second gear transmission mechanically coupled with the driving shaft and the driven shaft, and one or more cutters at least partially positioned in the crushing chamber, wherein the one or more cutters are mounted adjacent the driving shaft and the driven shaft, and wherein the one or more cutters are configured to crush the compacted organic waste to form a crushed organic waste; and a mixing unit configured to receive the crushed organic waste from the crushing unit, the mixing unit including:

a mixing compartment configured to receive the crushed organic waste; and a mixing shaft configured to be driven by the motor and configured to access the crushed organic waste of the mixing compartment, wherein the mixing shaft is configured to provide the crushed organic waste to a discharge outlet, wherein the discharge outlet is configured to discharge the crushed organic waste from the apparatus.

19. The apparatus of claim 18, wherein the probiotics are sprayed on the organic waste when generating the compacted organic waste.

20. The apparatus of claim 18, wherein the probiotics are sprayed on the organic waste when generating the crushed organic waste.

* * * * *